US011536029B2

(12) United States Patent
Beristany et al.

(10) Patent No.: US 11,536,029 B2
(45) Date of Patent: Dec. 27, 2022

(54) ADJUSTABLE ELECTRICAL FIXTURE MOUNTING ASSEMBLY

(71) Applicant: Hubbell Incorporated, Shelton, CT (US)

(72) Inventors: Victor Beristany, Mishawaka, IN (US); Krzysztof Wojciech Korcz, Granger, IN (US); Steven James Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 16/951,932

(22) Filed: Nov. 18, 2020

(65) Prior Publication Data

US 2021/0148117 A1 May 20, 2021

Related U.S. Application Data

(60) Provisional application No. 63/001,381, filed on Mar. 29, 2020, provisional application No. 62/937,871, filed on Nov. 20, 2019.

(51) Int. Cl.
| | |
|---|---|
| *H02G 3/12* | (2006.01) |
| *E04C 3/02* | (2006.01) |
| *E04B 9/18* | (2006.01) |
| *E04B 9/00* | (2006.01) |

(52) U.S. Cl.
CPC ............... *E04C 3/02* (2013.01); *E04B 9/006* (2013.01); *E04B 9/18* (2013.01); *H02G 3/125* (2013.01)

(58) Field of Classification Search
CPC .. E04C 3/02; E04B 9/006; E04B 9/18; H02G 3/125; F16M 13/027; A62C 35/68; B60R 2011/0004; E04G 21/243

USPC ........ 248/343, 201, 200.1, 205.1, 200, 546, 248/216.1, 214, 344, 906, 227.3, 227.4, 248/230.5, 231.61
See application file for complete search history.

(56) References Cited

U.S. PATENT DOCUMENTS

| | | | |
|---|---|---|---|
| 1,622,087 | A | 3/1927 | Calderwood |
| 1,754,849 | A | 4/1930 | Clayton |
| 2,321,640 | A | 6/1943 | Adkins |
| 2,732,162 | A | 1/1956 | McKinley |
| D223,686 | S | 5/1972 | Sadler et al. |
| 4,463,923 | A * | 8/1984 | Reiker ............... E04C 3/02 248/546 |

(Continued)

OTHER PUBLICATIONS

Hubbell Incorporated, RACO—Ceiling Fan Boxes Brochure, 2012, 4 pages.

(Continued)

*Primary Examiner* — Nkeisha Smith
(74) *Attorney, Agent, or Firm* — Wissing Miller LLP

(57) ABSTRACT

A mounting assembly is provided for quick and easy attachment to engineered joists. The mounting assembly includes a brace assembly and a mounting bracket. The mounting assembly may also include an electrical box. The brace assembly is an adjustable member that extends between flanges of engineered ceiling joists. The brace assembly has two low profile end caps that can engage the flanges of engineered ceiling joists and apply a force against the flanges when tightened. The mounting bracket is connected to a hanger body of the brace assembly by a snap fit and the electrical box is attached to the mounting bracket.

18 Claims, 27 Drawing Sheets

(56) References Cited

U.S. PATENT DOCUMENTS

| | | | | |
|---|---|---|---|---|
| 4,513,994 | A | 4/1985 | Dover et al. | |
| 4,518,141 | A * | 5/1985 | Parkin | F21V 21/03 248/217.2 |
| 4,682,452 | A * | 7/1987 | Propp | E04B 9/006 220/3.9 |
| 4,892,211 | A | 1/1990 | Jorgensen | |
| 4,909,405 | A * | 3/1990 | Kerr, Jr. | H02G 3/125 220/3.2 |
| 5,024,412 | A * | 6/1991 | Hung | H02G 3/20 220/3.9 |
| 5,044,582 | A | 9/1991 | Walters | |
| 5,150,868 | A * | 9/1992 | Kaden | H02G 3/126 248/200.1 |
| 5,234,119 | A * | 8/1993 | Jorgensen | H02G 3/20 220/3.9 |
| 5,272,605 | A | 12/1993 | Johnstone | |
| 5,303,894 | A | 4/1994 | Deschamps et al. | |
| 5,393,026 | A | 2/1995 | Deschamps et al. | |
| 5,484,076 | A | 1/1996 | Petrushka | |
| 5,624,202 | A | 4/1997 | Grierson | |
| D384,674 | S | 10/1997 | Grolle et al. | |
| 5,720,461 | A * | 2/1998 | Kerr, Jr. | E04B 9/006 248/317 |
| 5,809,719 | A * | 9/1998 | Ashton | E04G 23/0218 248/354.3 |
| 5,954,304 | A | 9/1999 | Jorgensen | |
| 6,595,479 | B2 * | 7/2003 | Johnson | F16B 5/0685 248/343 |
| 6,595,497 | B1 | 7/2003 | Linford et al. | |
| 6,761,341 | B2 | 7/2004 | Pfaller | |
| 6,889,943 | B2 | 5/2005 | Dinh et al. | |
| 7,148,420 | B1 | 12/2006 | Johnson et al. | |
| 7,429,025 | B1 * | 9/2008 | Gretz | H02G 3/20 248/546 |
| 7,631,849 | B2 * | 12/2009 | Chen | F04D 25/088 248/547 |
| 7,837,172 | B2 * | 11/2010 | Johnson | H02G 3/20 248/343 |
| 8,889,984 | B2 | 11/2014 | Korcz et al. | |
| 9,285,074 | B2 | 3/2016 | Korcz et al. | |
| 9,470,360 | B2 | 10/2016 | Korcz et al. | |
| 9,627,867 | B2 | 4/2017 | Korcz et al. | |
| D804,553 | S | 12/2017 | Takagi et al. | |
| 9,899,817 | B2 | 2/2018 | Korcz et al. | |
| 10,008,842 | B1 * | 6/2018 | Baldwin | F16M 13/02 |
| 10,218,109 | B2 | 2/2019 | Mortun | |
| 10,333,288 | B2 | 6/2019 | Korcz et al. | |
| D854,895 | S | 7/2019 | Cigarini | |
| D871,466 | S | 12/2019 | Okada et al. | |
| D884,757 | S | 5/2020 | Fujii | |
| D885,867 | S | 6/2020 | Chapman | |
| D898,654 | S | 10/2020 | Huang | |
| 2002/0171019 | A1 | 11/2002 | Johnson | |
| 2002/0179599 | A1 | 12/2002 | Dinh | |
| 2005/0045793 | A1 | 3/2005 | Johnson et al. | |
| 2005/0072590 | A1 * | 4/2005 | Hull | H02G 3/125 174/58 |
| 2005/0109907 | A1 | 5/2005 | Herth | |
| 2005/0121561 | A1 | 6/2005 | Sweigard | |
| 2007/0062317 | A1 | 3/2007 | Nagai et al. | |
| 2007/0137121 | A1 | 6/2007 | Roesch et al. | |
| 2014/0298933 | A1 | 8/2014 | Kohlmeyer et al. | |
| 2017/0331269 | A1 | 11/2017 | Hansen | |
| 2020/0325912 | A1 * | 10/2020 | Johnson | F04D 29/601 |

OTHER PUBLICATIONS

Hubbell Incorporated, RACO—Ceilng Fan Sales Drawings, Oct. 26, 2015, 1 page.

Hubbel Canada LLP, 4" Round Ceiling Fan-rated Support for Kwik-Brace Brochure for New Work, Pickering Ontario, Jul. 2012, 1 page.

Arlington Industries Brochure Heavy-duty Plated Steel Fan Fixture Box 2016 (1 page).

* cited by examiner

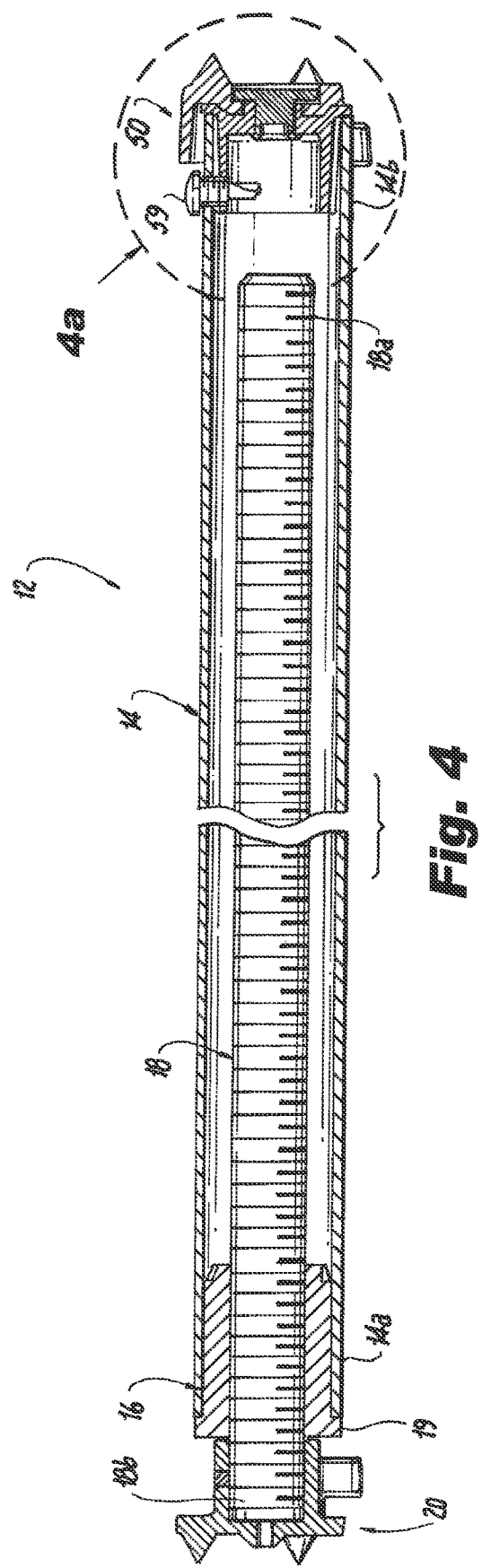
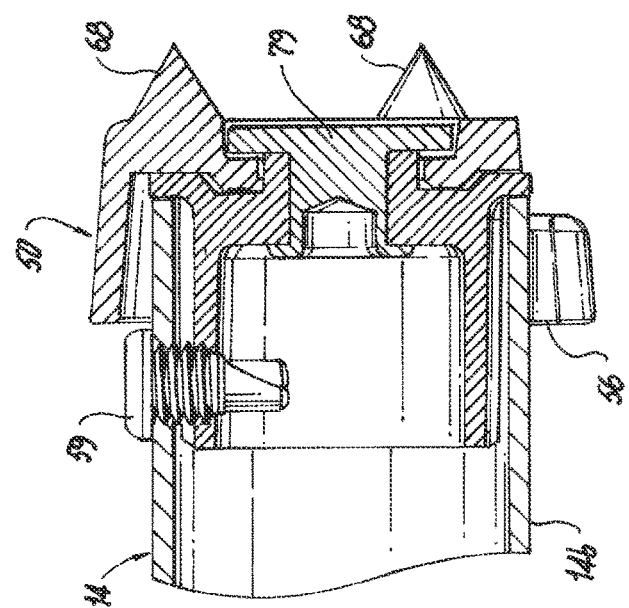

ADJUSTABLE ELECTRICAL FIXTURE MOUNTING ASSEMBLY

CROSS REFERENCE TO RELATED APPLICATIONS

The present disclosure is based on and claims benefit from U.S. Provisional Patent Application Ser. No. 62/937,871 filed on Nov. 20, 2019 entitled "Adjustable Electrical Fixture Mounting Assembly" and from U.S. Provisional Patent Application Ser. No. 63/001,381 filed on Mar. 29, 2020 entitled "Adjustable Electrical Fixture Mounting Assembly" the entire contents of both are incorporated herein by reference.

BACKGROUND

Field

The present disclosure relates to electrical fixture mounting assemblies mountable between ceiling joists or wall studs and used to support electrical fixtures. More particularly, the present disclosure relates to electrical fixture mounting assemblies mountable to ceiling joists and wall studs.

Description of the Related Art

Electrical fixture mounting assemblies have been used to mount electrical fixtures to a wall or ceiling. A commonly used electrical fixture mounting assembly for old construction ceiling joists has a brace that extends between a pair of ceiling joists and is secured to the ceiling joists by a tension force. The brace is generally designed to be inserted through a box opening in a ceiling and then mounted between parallel ceiling joists. A mounting bracket is then inserted through the box opening in the ceiling and positioned on or attached to the brace. Electrical cables can be inserted into the electrical box, and the electrical box is then inserted into the box opening and attached to the mounting bracket by suitable fasteners. An electrical fixture is then electrically connected to electrical wires within the electrical box, and the electrical fixture is attached to the electrical box so that the electrical fixture is securely held against the ceiling.

Tension type braces secured between the ceiling joists apply a force from each end of the brace against a respective joist. In order to provide sufficient force to withstand loads of certain fixtures, the ends of the brace need to engage the solid wood of the joist. However, with engineered joists the solid wood portion or flange forms a relatively small portion of the entire joist. More specifically, an engineered joist is shaped as an I-shaped joist with solid flanges at the top and bottom of the joist and a narrow web between the flanges. The thickness of the flanges is roughly between 1.5 inches and 1.75 inches so that the ends of conventional tension type braces need to contact the narrow thickness of the flanges so that the braces can be securely secured to the flanges. The ends of current tension type braces are not designed to contact the flanges. The present disclosure provides an electrical fixture mounting assembly that can be used with engineered joists.

SUMMARY

The present disclosure provides exemplary embodiments of electrical fixture mounting assemblies for old construction that can be mounted between ceiling joists and wall studs and used to support electrical fixtures. The electrical fixture mounting assemblies of the present disclosure are preferably configured to be mountable to engineered ceiling joists that have top and bottom flanges with a web between the top and bottom flanges to form an I-shaped structure.

In an exemplary embodiment, the electrical fixture mounting assembly includes a brace assembly, a mounting bracket and an electrical box. The brace assembly includes a hanger body, a plug, an adjustment member, a first end cap and a second end cap. The plug is positioned and secured at least partially within a first end of the hanger body. The adjustment member is operatively coupled to the plug such that rotation of the hanger body causes the adjustment member to move axially relative to the banger body. The first end cap is attached to an end of the adjustment member, and has a first cap body, a first leg extending from the first cap body and a second leg extending from the first cap body. The second end cap is attached to a second end of the hanger body such that the hanger body is rotatable relative to the second end cap. The second end cap has a second cap body, a third leg extending from the second cap body and a fourth leg extending from the second cap body. The mounting bracket is mounted to the brace assembly, and the electrical box is releasably secured to the mounting bracket and thus to the brace assembly.

In an exemplary embodiment, the electrical fixture mounting assembly includes a brace assembly, an extension assembly, a mounting bracket and an electrical box. The brace assembly includes a hanger body, a plug, an adjustment member, a first end cap and a second end cap. The plug is positioned at least partially within a first end of the hanger body. The adjustment member is operatively coupled to the plug such that rotation of the hanger body causes the adjustment member to move axially relative to the banger body. The first end cap is attached to an end of the adjustment member. The first end cap has a first cap body, a first leg extending from the first cap body and a second leg extending from the first cap body. The second end cap is attached to a second end of the hanger body such that the hanger body is rotatable relative to the second end cap. The second end cap having a second cap body, a third leg extending from the second cap body and a fourth leg extending from the second cap body. The extension assembly has an extension body and a locking member. The extension assembly is coupled to the hanger body and is moveable between a retracted position and an extended position so that when in the extended position the length of the brace assembly is increased. The mounting bracket is mounted to the brace assembly, and the electrical box is releasably secured to the mounting bracket.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a cross-sectional view of an exemplary embodiment of a brace assembly of the electrical fixture mounting assembly of FIG. 3 taken from line 4-4;

FIG. 4a is a cross-sectional view of a portion of the brace assembly of the electrical fixture mounting assembly of FIG. 4 taken from detail 4a;

DETAILED DESCRIPTION

The present disclosure provides exemplary embodiments of electrical fixture mounting assemblies for old construction environments where the electrical fixture mounting assemblies can be mounted between ceiling joists or wall studs and used to support electrical fixtures. In some embodiments, the electrical fixture mounting assemblies of the present disclosure are configured to be mountable to engineered ceiling joists that have top and bottom flanges with a web between the top and bottom flanges to form an I-shaped structure. In other embodiments, the electrical fixture mounting assemblies of the present disclosure are configured to be mountable to engineered ceiling joists and to solid wood joists and wall studs. For ease of description, the electrical fixture mounting assemblies may also be referred to herein as the "mounting assemblies" in the plural and the "mounting assembly" in the singular. The electrical fixtures may also be referred to herein as the "fixtures" in the plural and the "fixture" in the singular. The electrical fixtures that the mounting assemblies support include ceiling fans and light fixtures including chandeliers. The engineered ceiling joist may also be referred to herein as the "engineered joists" in the plural and the "engineered joist" in the singular. The solid wood joists and wall studs may also be referred to herein collectively as the "solid joists" in the plural and the "solid joist" in the singular.

Figure 1:
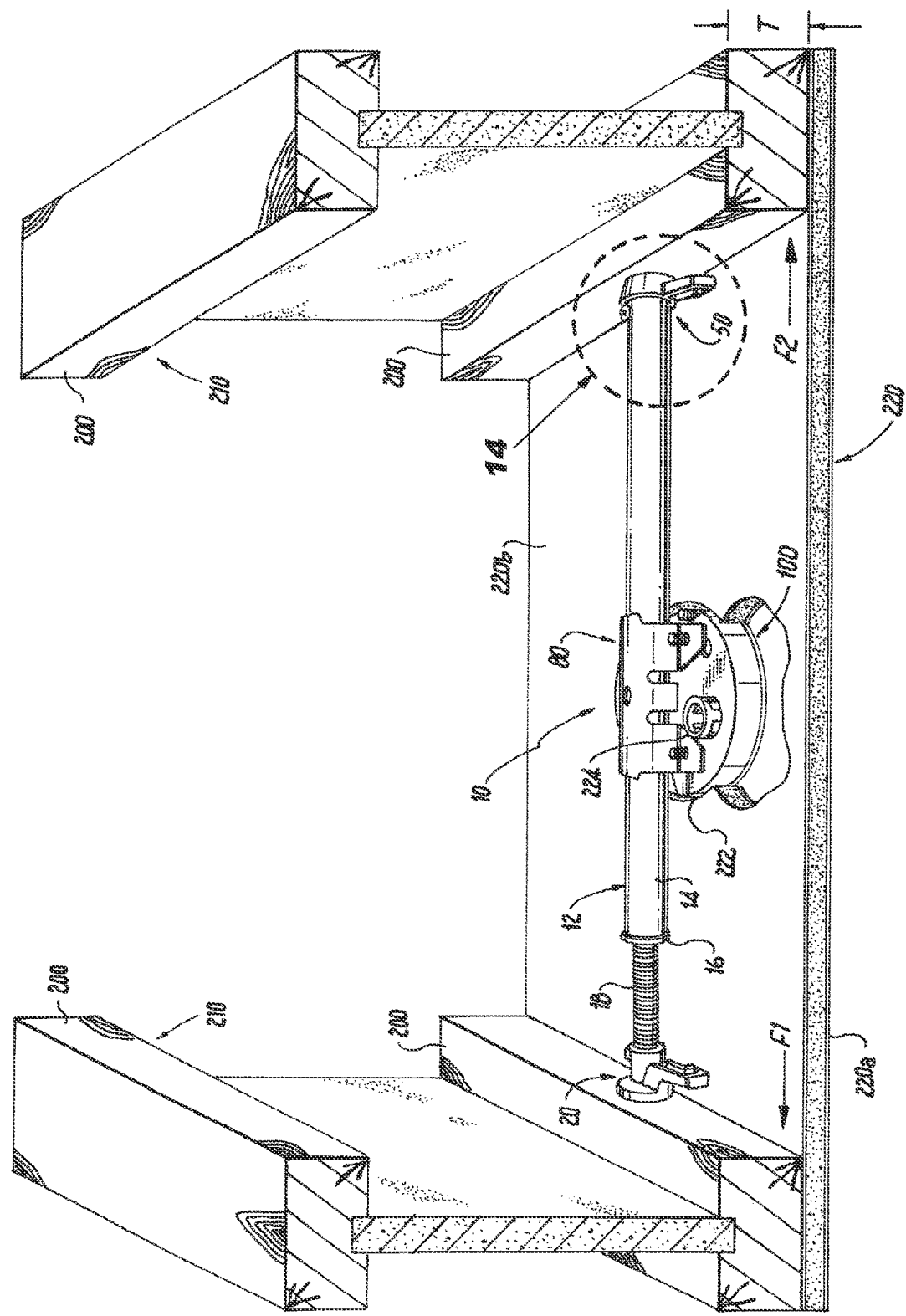
FIG. 1 is a perspective view of parallel engineered joists with an exemplary embodiment of an electrical fixture mounting assembly according to the present disclosure mounted between flanges of each joist with a low profile electrical box extending through a ceiling attached to the joists.
Figure 2:
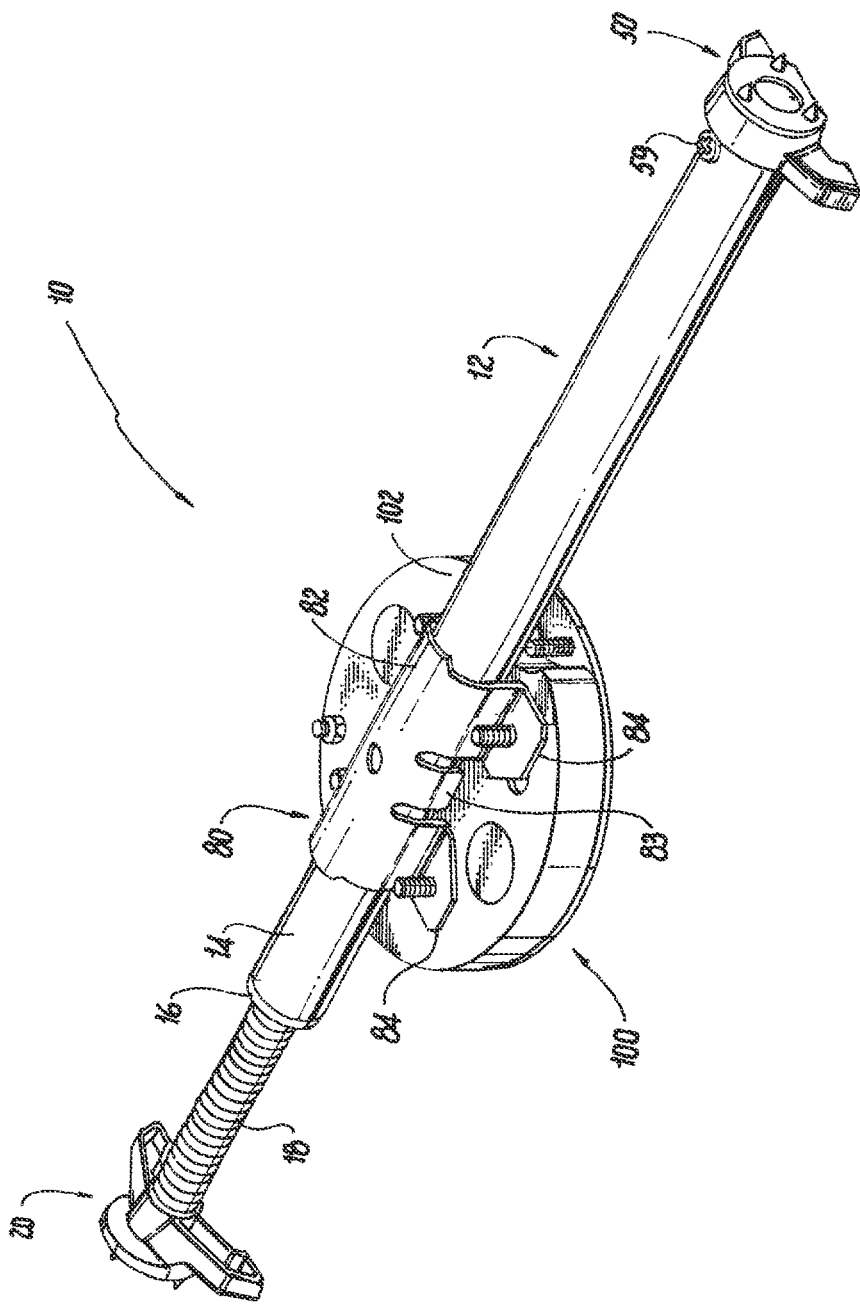
FIG. 2 is a perspective view of the electrical fixture mounting assembly of FIG. 1.
Figure 3:
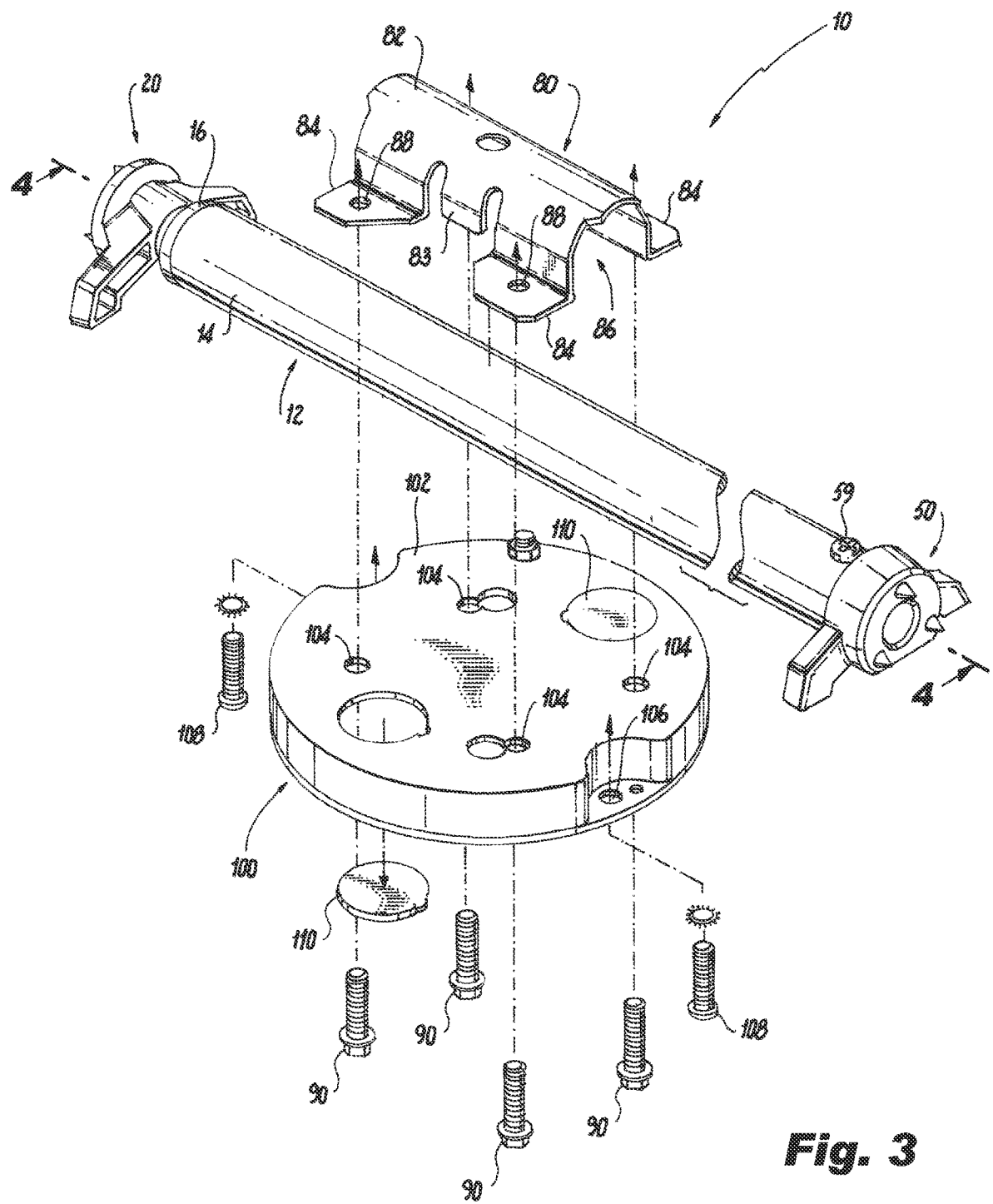
FIG. 3 is an exploded perspective view of the electrical fixture mounting assembly of FIG. 2.

Referring to FIGS. 1-3, an exemplary embodiment of a mounting assembly 10 contemplated by the present disclosure is shown. The mounting assembly 10 may include a brace assembly 12 and a mounting bracket 80. In another embodiment, the mounting assembly 10 contemplated by the present disclosure may include a brace assembly 12, a mounting bracket 80 and an electrical box 100. For ease of description, the electrical boxes 100 described herein may also be referred to herein as the "boxes" in the plural and the "box" in the singular. As seen in FIG. 1, in the contemplated embodiments, the brace assembly 12 is configured to span between flanges 200 of two parallel engineered joist 210 and to be secured to the flanges 200 using tension forces where each end cap 20 and 50 of the brace assembly 12 applies a force F1 or F2 in a direction away from a center of the brace assembly 12 toward their respective flange 200 of the engineered joist 210. The force needed to support an electrical fixture depends upon the load the brace assembly 12 is to support.

Referring to FIGS. 2 and 3, brace assembly 12 includes a hangar body 14, a plug 16, an adjustment member 18, a fixed end cap 20 and a swivel end cap 50, which will be described in more detail below. The mounting bracket 80 is used to releasably attach the electrical box 100 to the hanger body 14 of the brace assembly 12. In the exemplary embodiment shown, the mounting bracket 80 has a bracket body 82 and one or more flanges 84 extending outwardly from the bracket body 82. The mounting bracket 80 may also include one or more retention fingers 83 on each side of the mounting bracket body 82.

The bracket body 82 in this exemplary embodiment is a U-shaped body with a channel 86 configured and dimensioned to receive the hangar body 14 of the brace assembly 12. With the hangar body 14 within the channel 86 of the bracket body 82, the mounting bracket 80 is movable along an axial length of hangar body 14 so that the mounting bracket 80 can be aligned with a box opening 222 in the ceiling 220, seen in FIG. 1, through which the electrical box 100 will be attached to the mounting bracket 80. The one or more retention fingers 83 are configured so that a portion extends into the channel 86 of the bracket body 82 so that when the hanger body 14 is within the channel 86 the retention fingers 83 can apply sufficient pressure against the hanger body 14 to form a snap fit at least temporarily holding the hanger body 14 within the channel 86. The flanges 84 shown extend substantially at right angles relative to the body 82 such that the flanges 84 can rest against a back wall 102 of the electrical box 100 when the mounting bracket 80 is attached to the electrical box 100. However, the flanges 84 may extend at other angles relative to the body 82.

Each flange 84 has an aperture 88 used when releasably attaching the mounting bracket 80 to the electrical box 100 using fasteners 90, such as set screws.

Continuing to refer to FIGS. 2 and 3, the electrical box 100 in this exemplary embodiment is a round pancake box with a predefined shallow or low profile depth. For example, the shallow depth may be about ½" or about ⅔" to fit within a ceiling 220, such as ½" or ⅝" sheetrock ceiling. In this way, the open end of the electrical box 100 is flush with or recessed within the outer surface 220a of the ceiling 220 as shown in FIG. 1. The electrical box 100 includes one or more apertures 104 positioned on the back wall 102 such that the apertures 104 can be aligned with the apertures 88 in the flanges 84 of the mounting bracket 80 when the mounting bracket 80 is aligned with the electrical box 100. To secure a fixture (not shown) to the electrical box 100, the electrical box 100 includes one or more mounting apertures 106, e.g., threaded apertures, through which fasteners 108 may be threaded into. The electrical box 100 may also include one or more knock-outs 110 and/or pry-outs used for installing electrical cables into the electrical box via electrical connectors 224, seen in FIG. 1 or clamps positioned adjacent the knock-outs or pry-outs as is known. While the electrical box 100 is described herein as a round pancake box, the present disclosure contemplates that other low profile electrical boxes may be used such as square or rectangular electrical boxes.

Figure 5:
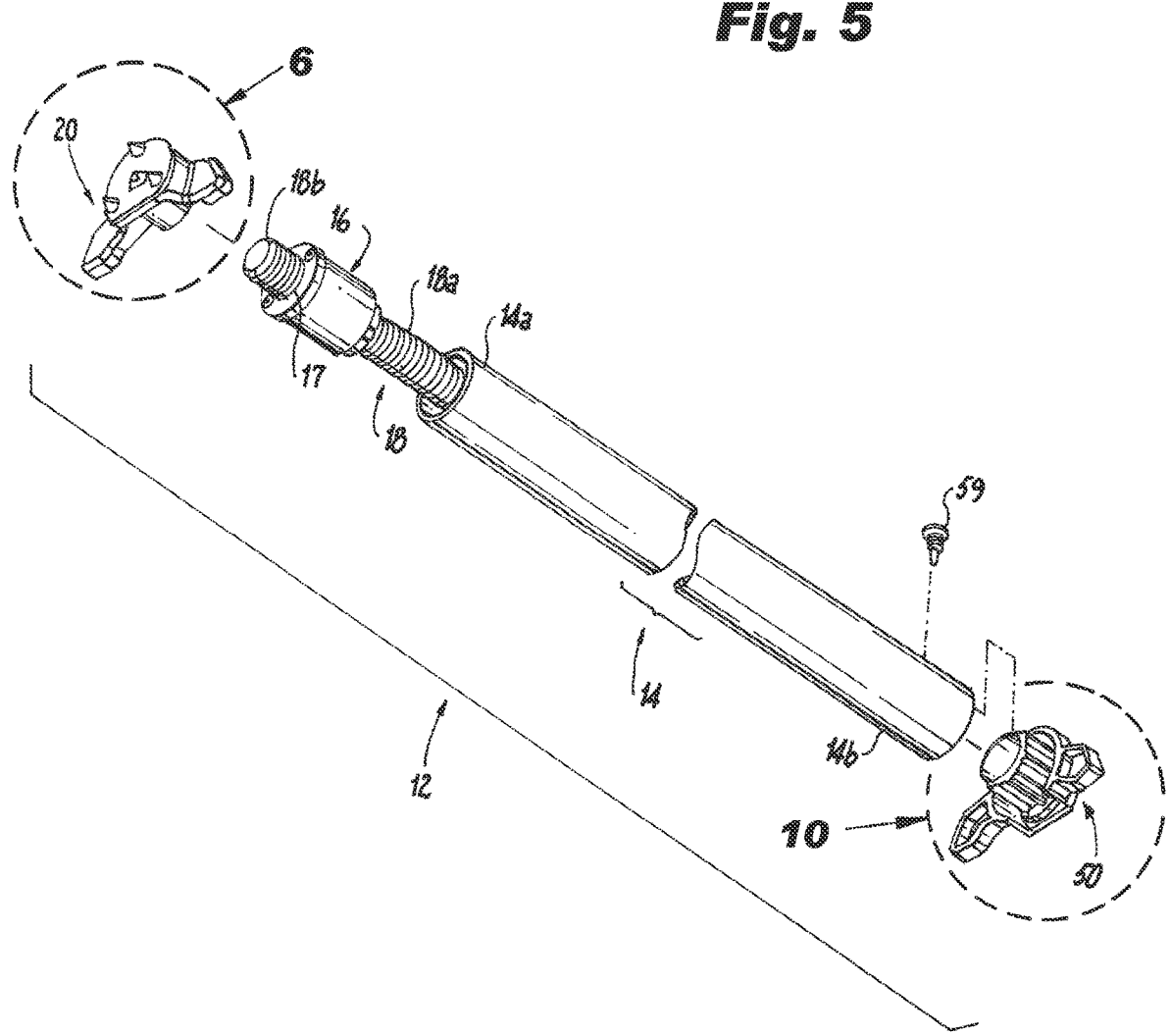
FIG. 5 is an exploded perspective view of the brace assembly of the electrical fixture mounting assembly of FIG. 2, illustrating a fixed end cap at one end of a hanger body of the brace assembly and a swivel end cap at the other end of the hanger body.
Figure 6:
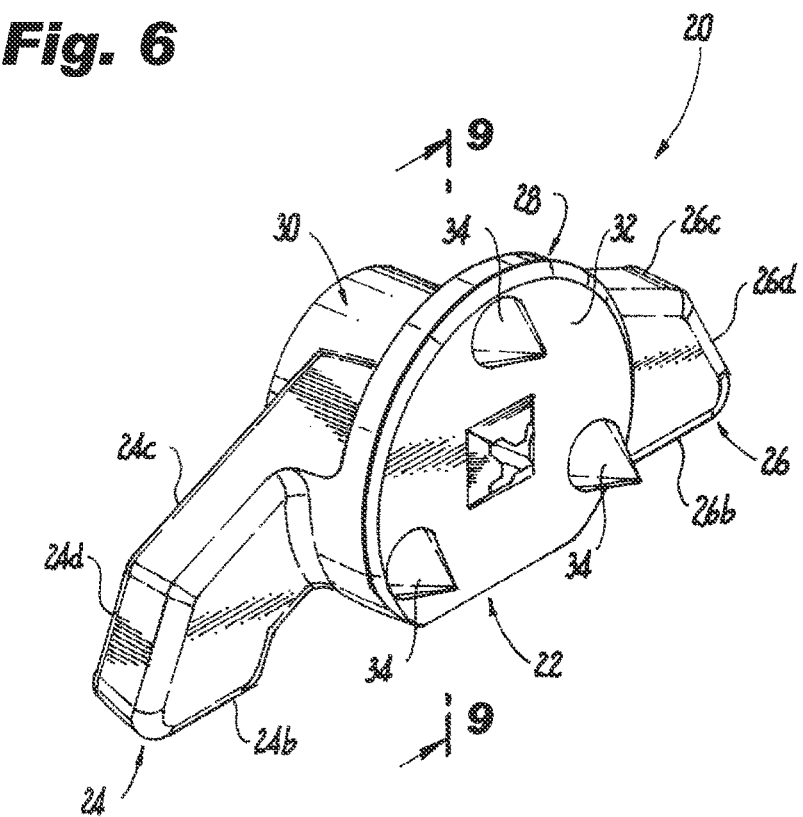
FIG. 6 is a front perspective view of the fixed end cap of FIG. 5, illustrating two legs extending from an end cap body of the fixed end cap.
Figure 7:
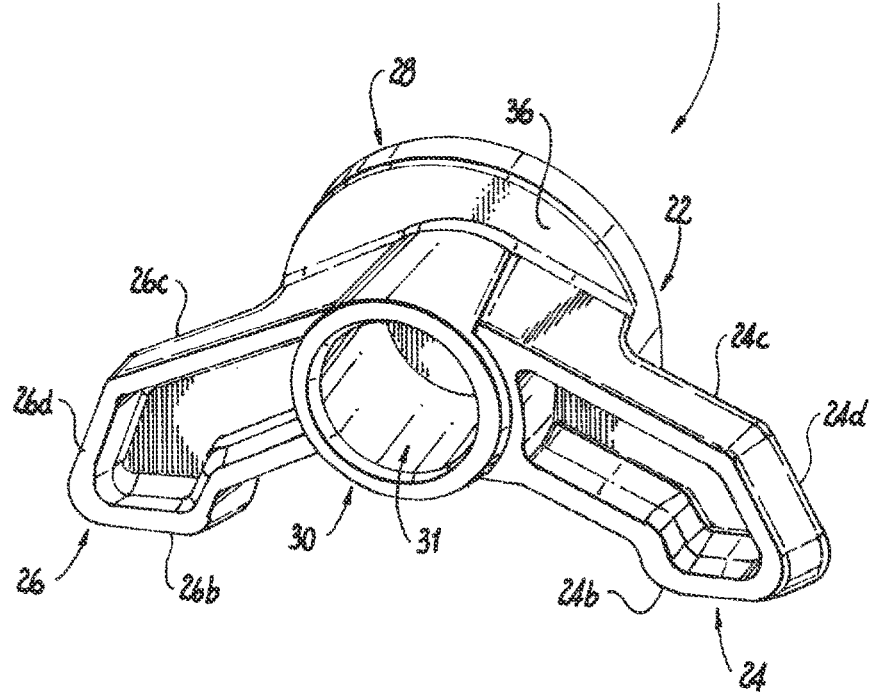
FIG. 7 is a rear perspective view of the fixed end cap of FIG. 6.

Referring now to FIGS. 4, 4a and 5, an exemplary embodiment of a brace assembly 12 according to the present disclosure is shown. As described above, the brace assembly 12 includes a hanger body 14, a plug 16, an adjustment member 18, a fixed end cap 20 and a swivel end cap 50. The hanger body 14 is preferably an elongated member that may be hollow, solid, or partially hollow and partially solid. In the exemplary embodiment shown, the hanger body 14 is a substantially cylindrical hollow tube that can receive the adjustment member 18, which in this embodiment is a threaded rod. It is noted that while the adjustment member 18 is described herein as a mechanical structure, e.g., a threaded rod, the present disclosure contemplates other structures may be used for the adjustment member 18, such as pneumatic or hydraulic structures. The plug 16 is secured to and at least partially within one end, e.g., the first end 14a, of the hanger body 14. The plug 16 is configured and dimensioned to operatively interact with the adjustment member 18 so that the adjustment member 18 and hanger body 14 are movable relative to each other between an extended position and a retracted position which is shown in FIG. 4. The extended position may vary depending upon the span between the engineered joints 210. For example, if the engineered joists 210 are separated by about 24" on center, the extended position may range from about 12 inches to about 14.5 inches. In the exemplary embodiment shown, the plug 16 is a cylindrical member configured and dimensioned to fit within first end 14a of the hanger body 14. The plug 16 includes an opening 17, e.g., a threaded bore, configured to operatively interact with the adjustment members 18. The plug 16 may also include a flange 19 used as a stop to limit the distance the plug 16 can extend into the hanger body 14. The plug 16 may be secured to the hanger body 14 by, for example, a press fit, adhesives or mechanical fasteners. In the exemplary embodiment shown, the plug 16 is a cylindrical member having an outer diameter that is slightly greater than the inner diameter of the hanger body 14 so that the plug 16 can be press fit to the first end 14a of the hanger body.

Referring now to FIGS. 4-9, the fixed end cap 20 is secured to portion 18b of the adjustment member 18, as shown in FIGS. 4 and 5. As shown in FIGS. 6-9, the fixed end cap 20 includes a cap body 22, a first leg 24 extending from one side of the cap body 22 and a second leg 26 extending from another side of the cap body 22. The cap body 22 includes a pressure member 28 and a mounting member 30. A height "H1" of the pressure member 28 of the cap body 22 is preferable the same as or less than a thickness "T" of the flange 200 of the engineered joist 210, seen in FIG. 1. The pressure member 28 may have a substantially flat front surface 32 with one or more joist engaging members 34 extending away from the front surface 32. In an exemplary embodiment, the one or more joist engaging members 34 may be pointed spikes similar to the spikes shown in FIG. 6. The mounting member 30 extends from a rear surface 36 of the pressure member 28, and is configured and dimensioned to be attached to an end of the adjustment member 18, seen in FIG. 4. In the exemplary embodiment shown in FIG. 5, with a threaded rod as the adjustment member 18, the mounting member 30 is a cylindrical member with an opening 31 having an inner diameter that is slightly less than the outer diameter of the threaded rod 18 so that the fixed end cap 20 can be press fit onto the portion 18b of the threaded rod 18 extending out of the plug 16, seen in FIG. 5.

Continuing to refer to FIGS. 5-9, the first and second legs 24 and 26 are integral with or monolithically formed into the mounting member 30, the pressure member 28 or both the mounting member 30, the pressure member 28, or the first and second legs 24 and 26 can be secured to the mounting member 30, the pressure member 28 or both the mounting member 30, the pressure member 28 using welds, adhesives or mechanical fasteners. The first and second legs 24 and 26 are configured and dimensioned to support the fixed end cap 20 from a ceiling 220, seen in FIG. 1, and provide a predefined low profile distance between the hangar body 14 and the inside surface 220b of the ceiling 220. More specifically, the first leg 24 extends a length "L1" relative to a vertical axis "Cv" of the cap body 22, and the second leg 26 extends a length "L2" relative to a vertical axis "Cv" of the cap body 22 such that the overall length "L3" from an end 24a of the first leg 24 to an end 26a the second leg 26 is the sum of the length "L1" and the length "L2." The length "L3" may be in a range of at least about 2.375 inches and about 2.625 inches so that the brace assembly 12 can support the weight of the electrical fixture (not shown) attached to the electrical box 100, seen in FIG. 1. The lengths "L1" and "L2" may be the same or they may differ. In the exemplary embodiment shown, the lengths "L1" and "L2" are the same.

Figure 8:
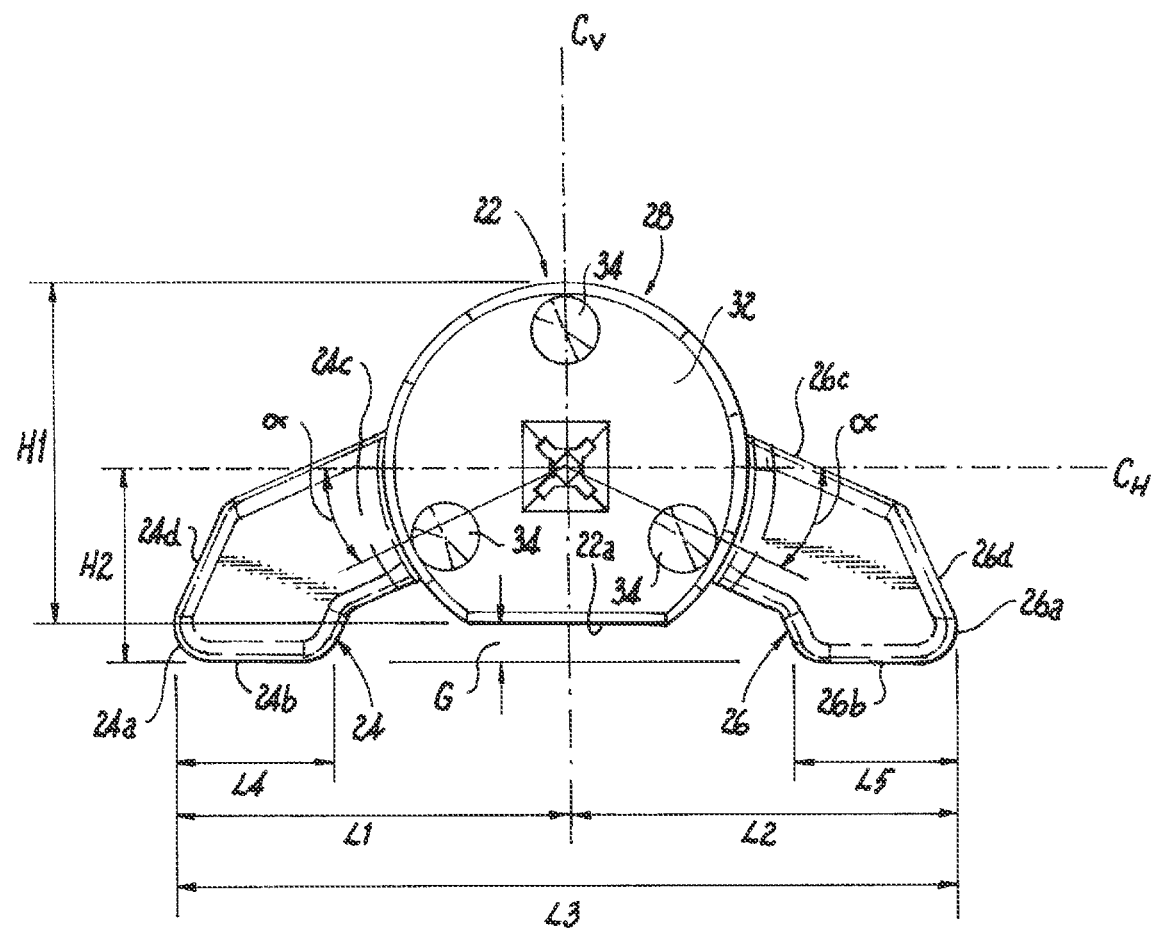
FIG. 8 is a front elevation view of the fixed end cap of FIG. 6.
Figure 9:
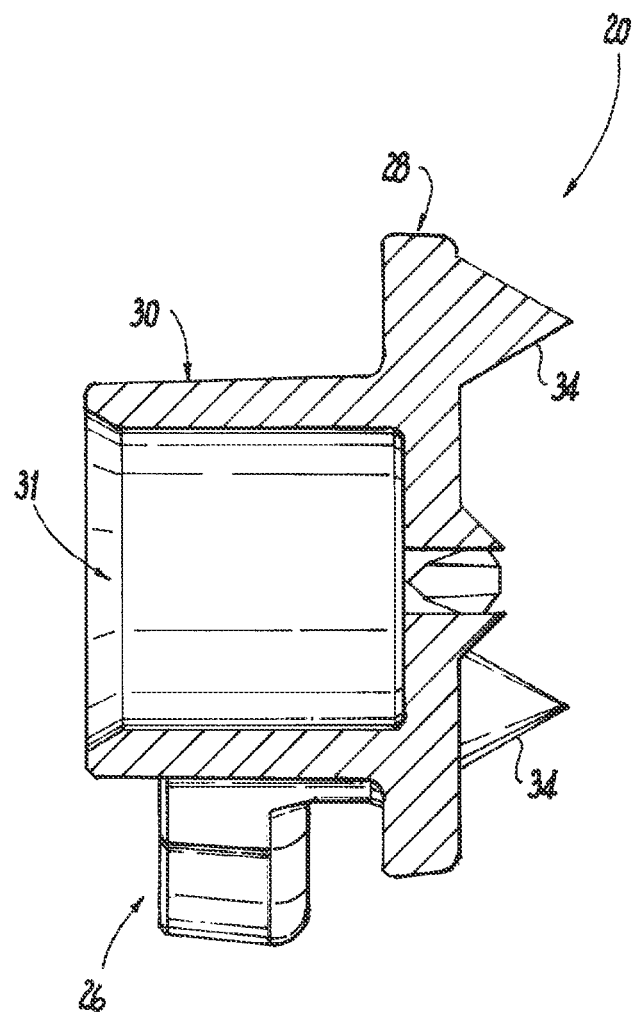
FIG. 9 is a cross-sectional view of the fixed end cap of FIG. 6 taken from line 9-9.

Continuing to refer to FIG. 8, the first leg 24 has a bottom surface 24b configured to rest on an inner surface 220b of the ceiling 220, seen in FIG. 1. The bottom surface 24b has a length "L4" that is sufficient to help support the weight of an electrical fixture attached to the electrical box 100. The length "L4" may be from about 0.500 inches to about 0.625 inches. Similarly, the second leg 26 has a bottom surface 26b configured to rest on the inner surface 220b of the ceiling 220. The bottom surface 26b has a length "L5" that is sufficient to help support the weight of an electrical fixture attached to the electrical box 100. The length "L5" may be from about 0.500 inches to about 0.625 inches. In the embodiments shown, the bottom surfaces 24b and 26b of the legs 24 and 26 are substantially flat. However, the present disclosure contemplates that the bottom surfaces 24b and 26b of the legs 24 and 26 may be in any other suitable shape sufficient to rest on the inner surface 220b of the ceiling 220.

A height "H2" between the bottom surfaces 24b and 26b of the legs and a central horizontal axis $C_H$ of the cap body 22 is sufficient to ensure that an open end of the electrical box 100 extending through the box opening 222 in the ceiling 220 is flush with the outer surface 220a of the ceiling 220 or recessed within the ceiling. The bottom surfaces 24b and 26b are substantially parallel to the central horizontal axis $C_H$ of the cap body 22. The height "H2" may result in a gap "G" between a bottom wall 22a of the cap body 22 and the bottom surfaces 24b and 26b of the legs 24 and 26. The height "H2" may be in the range of about ½ inch and about 1.0 inch, and the gap "G" may be in the range of about 1/100 of an inch and about ¼ inch. In the exemplary embodiment shown in FIGS. 1 and 8, using an electrical box 100 having a depth of about ½" and a ceiling 220 made of ½" sheetrock, the height "H2" may be from about 0.500 inches and about 0.688 inches, and the gap "G" may be from about 0.050 inches and about 0.238 inches. The shape and orientation of the legs 24 and 26 may vary depending upon a number of factors, including the cost to manufacture and the load the mounting assembly 10 is to support. For example, in the embodiment shown in FIG. 8, each leg 24 and 26 has a first portion 24c and 26c that extends from the mounting member 30 of the end cap body 22 at an angle "a" relative to the horizontal axis "$C_H$" and a second portion 24d and 26d that extends from the first portion 24c and 26c so that the bottom surfaces 24b and 26b of the second portion may rest on the inner surface 220b of the ceiling 220 as shown in FIG. 1.

Referring now to FIGS. 10-13, the swivel end cap 50 is secured at a second end 14b of the hanger body 14, seen in FIGS. 4 and 5. The swivel end cap 50 includes a cap body 52, a first leg 54, a second leg 56 and a mounting member 58. The cap body 52 includes a pressure member 60 having a central aperture 62 and a shroud 64. A height "H1" of the pressure member 60 of the cap body 52 is preferable the same as or less than a thickness "T" of the flange 200 of the engineered joist 210, seen in FIG. 1. The pressure member 60 may have a substantially flat front surface 66 with one or more joist engaging members 68 extending away from the front surface 66. In an exemplary embodiment, the one or more joist engaging members 68 may be pointed spikes similar to the spikes shown in FIG. 10.

Figures 10, 11:
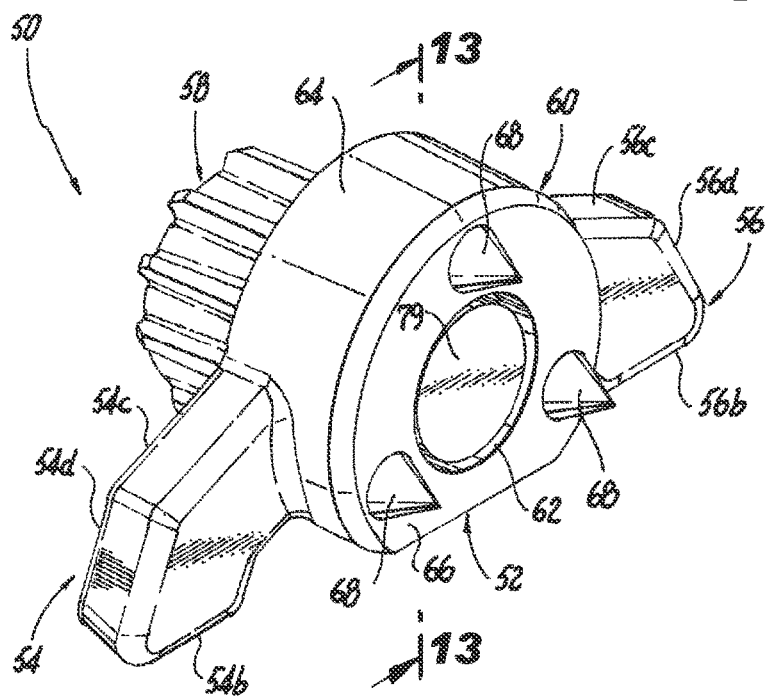
FIG. 10 is a front perspective view of the swivel end cap of FIG. 5, illustrating two legs extending from an end cap body of the swivel end cap.
FIG. 11 is an exploded rear perspective view of the swivel end cap of FIG. 10.
Figure 13:
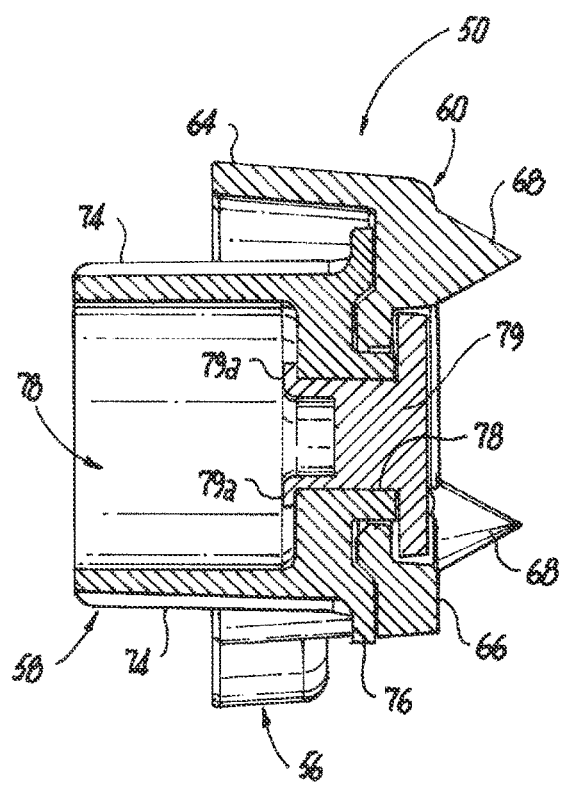
FIG. 13 is a cross-sectional view of the swivel end cap of FIG. 10 taken from line 13-13.

Referring to FIGS. 4, 4a and 11, the mounting member 58 is rotatably attached to the cap body 52 and is positioned adjacent a rear surface 70 of the pressure member 60. The mounting member 58 is configured and dimensioned to be secured to an end of the hangar body 14 using a fastener 59, such as a sheet metal screw, as seen in FIGS. 4 and 4a. In the exemplary embodiment shown in FIG. 11, the mounting member 58 has a cylindrical body 72, a plurality of ribs 74 and a base 76. The ribs 74 are positioned around a perimeter of the body 72 and extend outward from the body as shown. The base 76 has a central opening 78, seen in FIG. 13, that can be aligned with the central aperture 62 in the pressure member 60 when rotatably attaching the mounting member 58 to the cap body 52, which is described in more detail below. In this configuration, the ribs 74 form an outer diameter that is slightly greater than the inner diameter of the hangar body 14 so that the swivel end cap 50 can be press fit onto the second end 14b of the hangar body 14, seen in FIGS. 4 and 4a. To rotatably attach the mounting member 58 to the cap body 52, a fastener 79, such as a rivet, is inserted through the central aperture 62 in the pressure member 60 and through the central opening 78 in the base 76. The free ends 79a of the fastener 79 are then folded back as seen in FIG. 13 to loosely attached the mounting member 58 to the pressure member 60 allowing the mounting member 58 to rotate relative to the pressure member 60.

Continuing to refer to FIG. 10-13, the first and second legs 54 and 56 are integral with or monolithically formed into the shroud 64 of the pressure member 60, or the first and second legs 54 and 56 can be secured to the shroud 64 of the pressure member 60 using welds, adhesives or mechanical fasteners. The first and second legs 54 and 56 are configured and dimensioned to support the swivel end cap 50 from a ceiling 220, seen in FIGS. 1 and 14, and provide a predefined low profile distance between the hangar body 14 and the inside surface 220*b* of the ceiling 220. More specifically, the first leg 54 extends a length "L1" relative to a vertical axis "Cv" of the cap body 52, and the second leg 56 extends a length "L2" relative to a vertical axis "Cv" of the cap body 52 such that an overall length "L3" from an end 54*a* of the first leg 54 to an end 56*a* the second leg 56 is the sum of the length "L1" and the length "L2." The length "L3" may be in the range of at least about 2.375 inches and about 2.625 inches so that the brace assembly 12 can support the weight of an electrical fixture (not shown) attached to the electrical box 100. The lengths "L1" and "L2" may be the same or they may differ. In the exemplary embodiment shown, the lengths "L1" and "L2" are the same.

Figure 12:
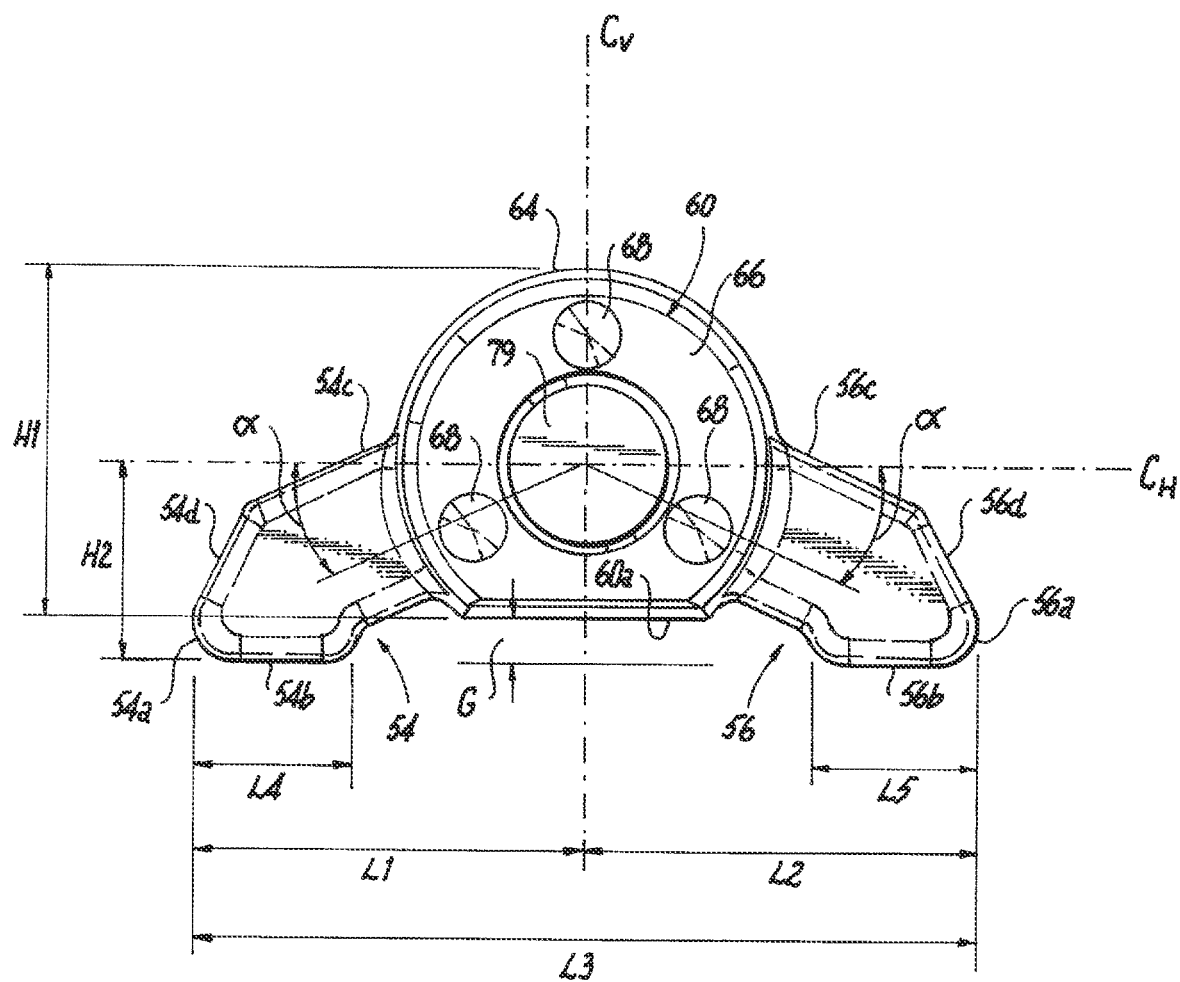
FIG. 12 is a front elevation view of the swivel end cap of FIG. 10.

Continuing to refer to FIG. 12, the first leg 54 has a bottom surface 54*b* configured to rest on an inner surface 220*b* of the ceiling 220. The bottom surface 54*b* has a length "L4" that is sufficient to help support the weight of an electrical fixture attached to the electrical box 100. The length "L4" may be from about 0.500 inches to about 0.625 inches. Similarly, the second leg 56 has a bottom surface 56*b* configured to rest on the inner surface 220*b* of the ceiling 220. The bottom surface 56*b* has a length "L5" that is sufficient to help support the weight of an electrical fixture attached to the electrical box 100. The length "L5" may be from about 0.500 inches to about 0.625 inches. In the embodiments shown, the bottom surfaces 54*b* and 56*b* of the legs 54 and 56 are substantially flat. However, the present disclosure contemplates that the bottom surfaces 54*b* and 56*b* of the legs 54 and 56 may be in any other suitable shape sufficient to rest on the inner surface 220*b* of the ceiling 220. A height "H2" between the bottom surfaces 54*b* and 56*b* of the legs and a central horizontal axis $C_H$ of the cap body 52 is sufficient to ensure that an open end of the electrical box 100 extending through the box opening 222 in the ceiling 220 is flush with the outer surface 220*a* of the ceiling 220 or recessed within the ceiling. The bottom surfaces 54*b* and 56*b* are substantially parallel to the central horizontal axis $C_H$ of the cap body 52. The height "H2" may result in a gap "G" between a bottom wall 60*a* of the cap body 52 and the bottom surfaces 54*b* and 56*b* of the legs. The height "H2" may be in the range of about ½ inch and about 1.0 inch, and the gap "G" may be in the range of about 1/100 of an inch and about ¼ inch. In the exemplary embodiment shown in FIGS. 1 and 8, using an electrical box 100 having a depth of about ½" and a ceiling 220 made of ½" sheetrock, the height "H2" may be from about 0.500 inches and about 0.688 inches, and the gap "G" may be from about 0.050 inches and about 0.238 inches. The shape and orientation of the legs 54 and 56 may vary depending upon a number of factors, including the cost to manufacture and the load the mounting assembly 10 is to support. For example, in the embodiment shown in FIGS. 8 and 12, each leg 54 and 56 has a first portion 54*c* and 56*c* that extends from the mounting member 60 of the end cap body 52 at an angle "a" relative to the central horizontal axis "$C_H$" and a second portion 54*d* and 56*d* that extends from the first portion 54*c* and 56*c* so that the bottom surfaces 54*b* and 56*b* of the second portion may rest on the inner surface 220*b* of the ceiling 220 as shown in FIG. 1. It is noted that when the fixed end cap 20 is secured to the adjustment member 18 and the swivel end cap 50 is secured to the hanger body 14, the bottom surfaces 24*b* and 26*b* of the cap body 22 and the bottom surfaces 54*b* and 56*b* of the cap body 52 preferably lie in the same plane.

Figure 14:
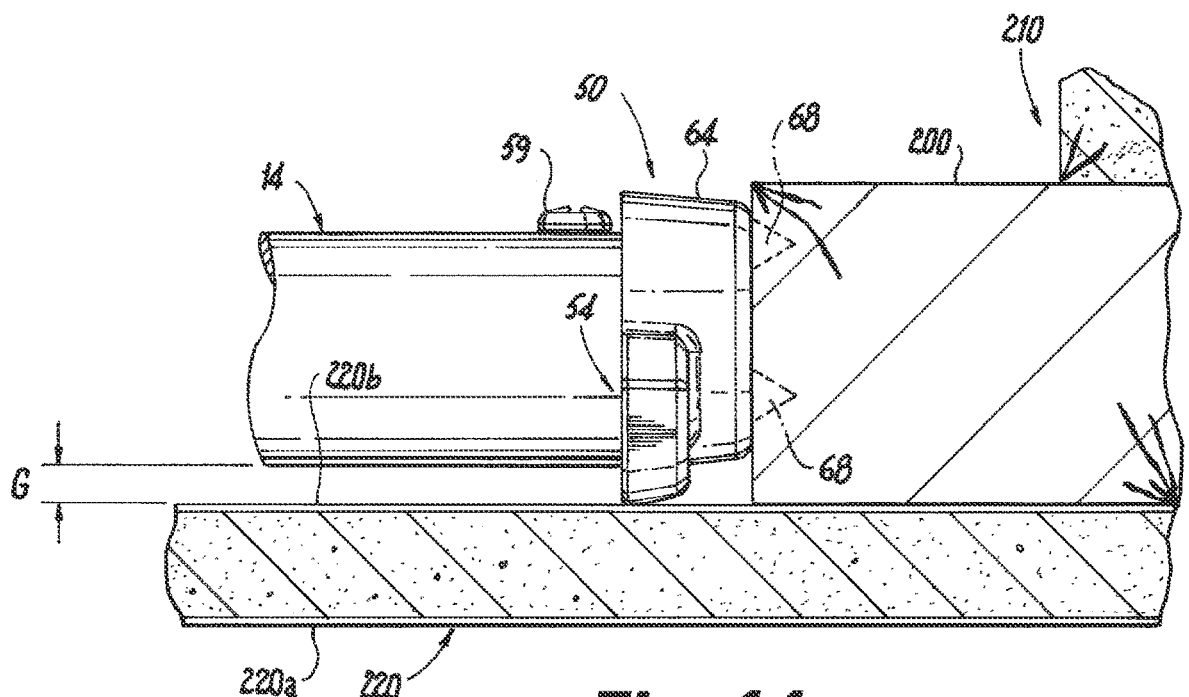
FIG. 14 is an enlarged side elevation view of a portion of an engineered ceiling joist and an end of the brace assembly of the electrical fixture mounting assembly of FIG. 1, illustrating joist engaging members extending from a swivel end cap of the brace assembly embedded within the flange of the engineered ceiling joist and legs of the swivel end cap resting on a ceiling.

An example of the operative interaction of the plug 16 and the adjustment member 18 for securing the brace assembly 12 to engineered joists 210 will be described with reference to FIGS. 1, 4, 5 and 14. In this exemplary embodiment, the plug 16 is a cylindrical member having a threaded bore 17 and the adjustment member 18 is a threaded rod that can fit within the threaded bore 17 of the plug 16. The plug 16 is press fit into the first end 14*a* of the hanger body 14, and the threaded rod 18 is threaded through the threaded bore 17 in the plug 16 so that a portion 18*a* of the threaded rod is within the hanger body 14 and a portion 18*b* of the threaded rod 18 extends out of the plug 16 away from the hanger body 14. In this configuration, the hanger body 14 can be rotated with respect to threaded rod 18, via the box opening 222 in the ceiling 220, to expand or contract the axial length of the brace assembly 12. By expanding the axial length of the brace assembly 12 the fixed end cap 20 and swivel end cap 50 of the brace assembly 12 can be moved into engagement with the flanges 200 of respective engineered joist 210, as seen in FIGS. 1 and 14, so that the joist engaging members 34 and 68 penetrate the respective flange 200. Further expansion of the axial length of the brace assembly 12 increases the force F1 and F2 applied by the fixed end cap 20 and swivel end cap 50 onto the flanges 200 of the engineered joists 210 to firmly secure the brace assembly 12 between the engineered joists 210.

Figure 15:
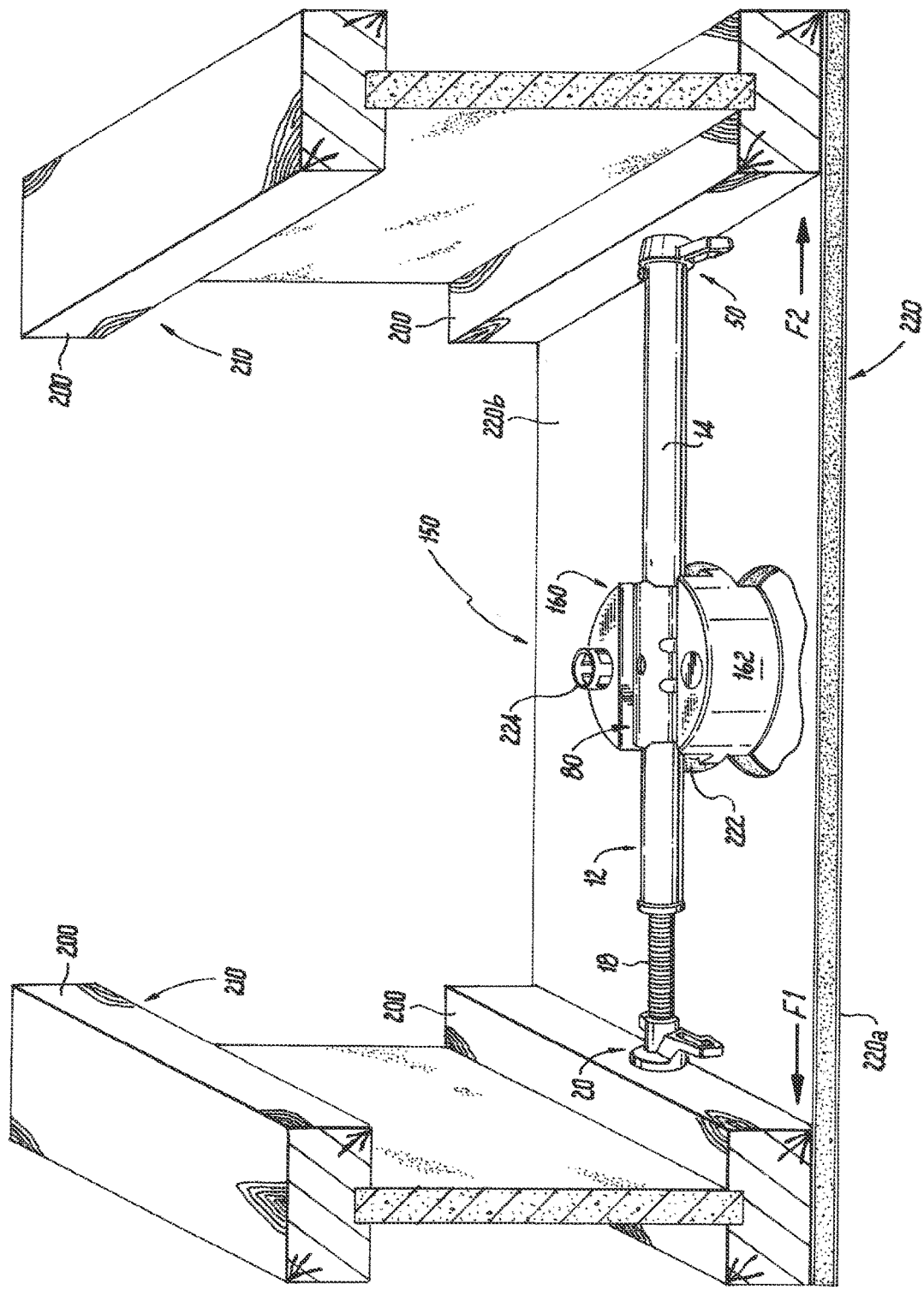
FIG. 15 is a perspective view of parallel engineered joists with another exemplary embodiment of an electrical fixture mounting assembly according to the present disclosure mounted between flanges of each joist.
Figure 16:
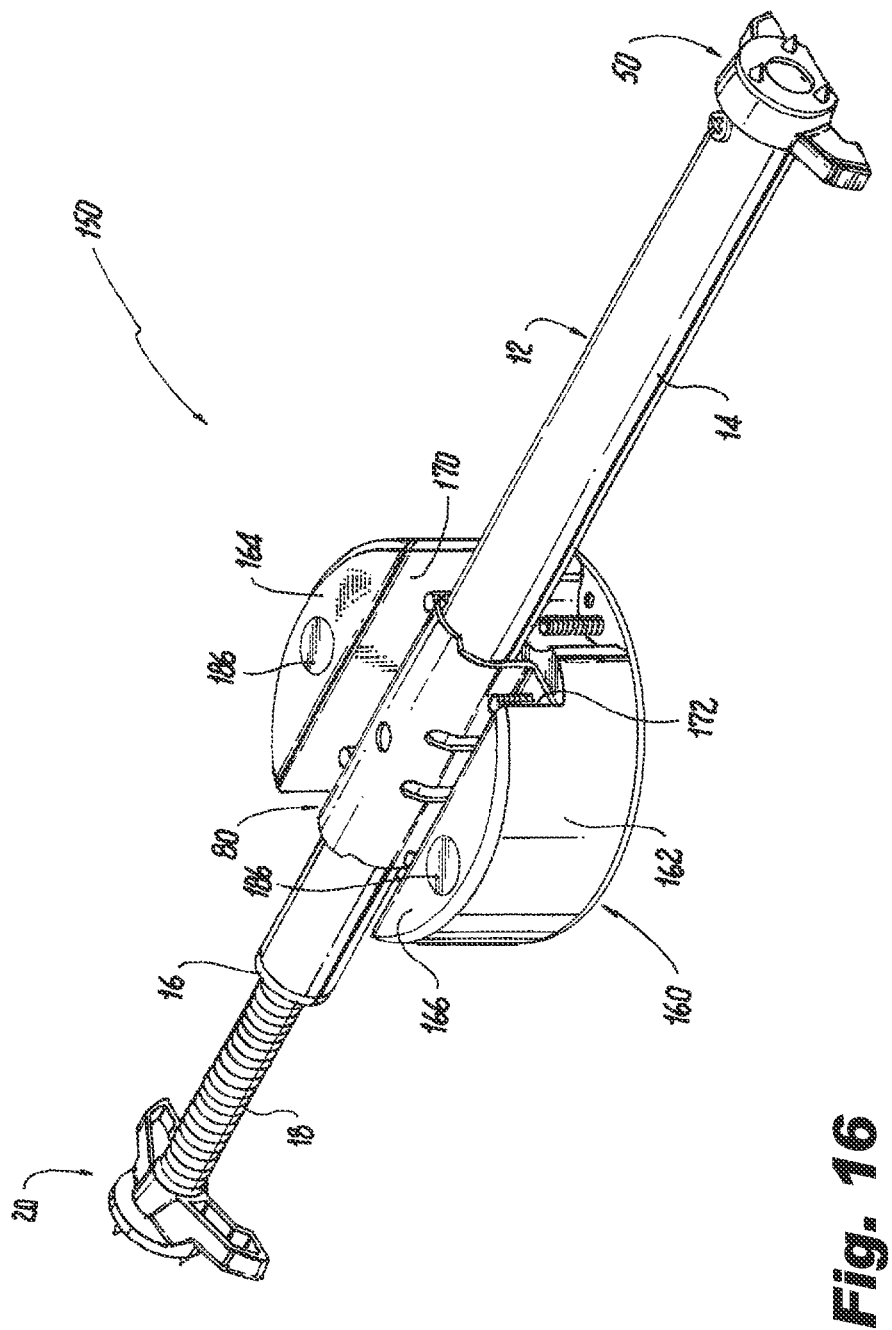
FIG. 16 is a perspective view of the electrical fixture mounting assembly of FIG. 15.
Figure 17:
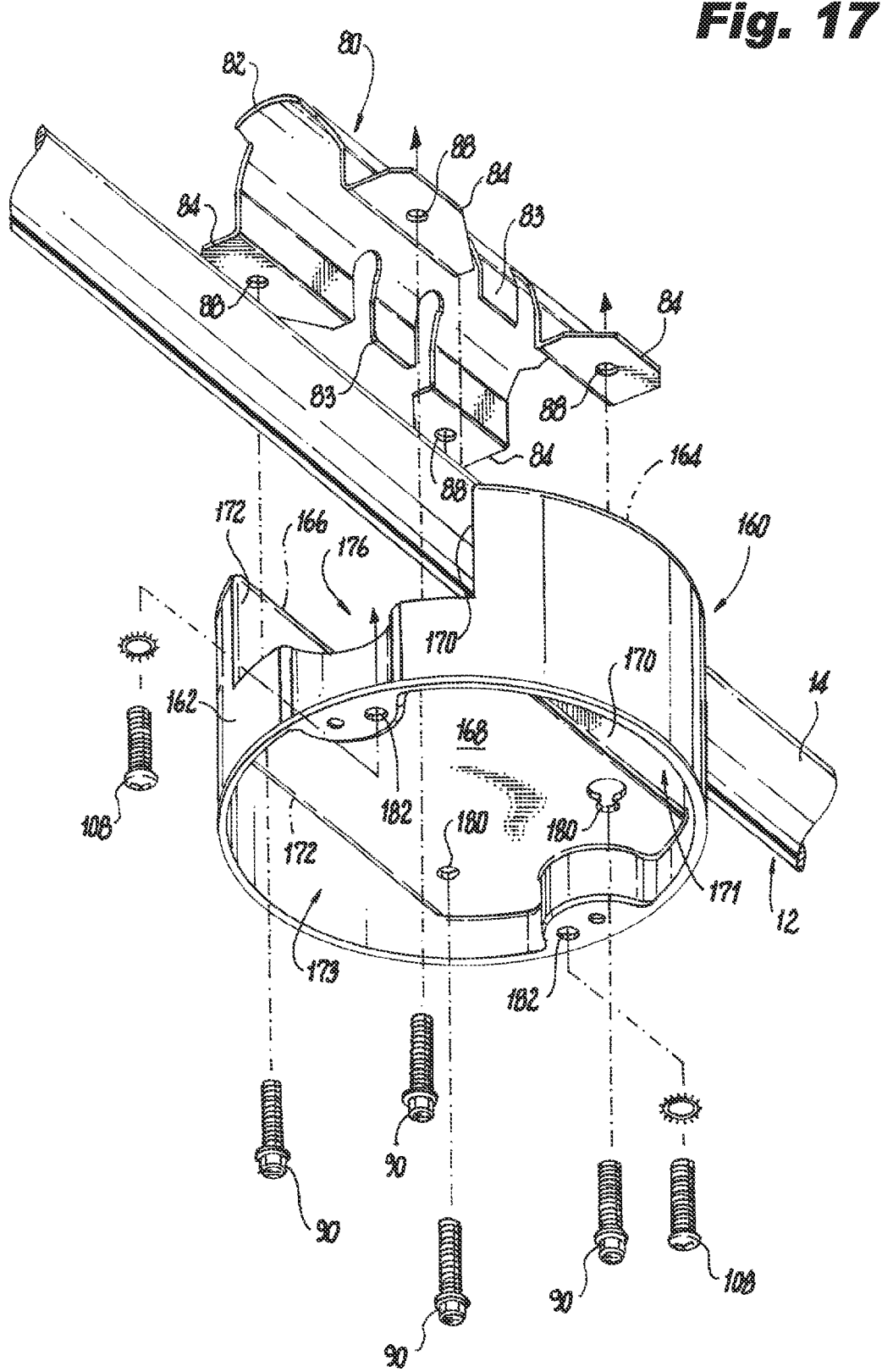
FIG. 17 is an exploded perspective view of the electrical fixture mounting assembly of FIG. 16.

Turning now to FIGS. 15-17, another exemplary embodiment of the mounting assembly according to the present disclosure is shown. In this exemplary embodiment, the mounting assembly 150 includes a brace assembly 12, a mounting bracket 80 and an electrical box 160. The brace assembly 12 and the mounting bracket 80 are the same as the brace assembly and mounting bracket described above and for ease of description are not repeated. In this exemplary embodiment, the electrical box 160 is configured to straddle the hanger body 14 of the brace assembly 12 to provide additional space in which to store electrical wires within the box 160. More specifically, the electrical box 160 includes one or more outer side walls 162, a first bottom wall segment 164, a second bottom wall segment 166 and a third bottom wall segment 168 between the first and second bottom wall segments 164 and 166. The electrical box 160 also includes one or more inner side walls. In this exemplary embodiment, the one or more inner side walls includes a first inner side wall 170 and a second inner side wall 172. The first inner side wall 170 extends from an edge of the first bottom wall segment 164 to an edge of the third bottom wall segment 168 creating a cavity 171 within the electrical box 160. The second inner side wall 172 extends from an edge of the second bottom wall segment 166 to an edge of the third bottom wall segment 168 creating a cavity 173 within the electrical box 160. The inner side walls 170 and 172 and the third bottom wall segment 168 form a channel 176 between the inner side walls 170 and 172 that is configured and dimensioned to receive the hanger body 14 of the brace assembly 12. The portion "P" of the box 160 adjacent the channel 176 forms a low profile portion of the box 160 which performs the same function as the low profile box 100 described above. The third bottom wall segment 168 has one or more apertures 180 positioned for alignment with the apertures 88 in the flanges 84 of the mounting bracket 80 when the mounting bracket 80 is aligned with the electrical box 160. When the one or more apertures 180 are aligned with the apertures 88 in the flanges 84, the mounting bracket 80 can be secured to the electrical box 160 using fasteners 90, such as set screws. To secure a fixture (not shown) to the electrical box 160, the electrical box 160 includes one or more mounting apertures 182, e.g., threaded apertures, through which fasteners 108 may be threaded into. The electrical box 160 may also include one or more knock-outs 186 and/or pry-outs used for installing electrical cables into the electrical box via electrical connectors 224, seen in FIG. 15 or clamps positioned adjacent the knock-outs 186 or pry-outs as is known. While the electrical box 160 is shown as a round box, the present disclosure contemplates that other electrical boxes may be used such as square or rectangular electrical boxes.

Referring to FIGS. 18-23, another exemplary embodiment of a mounting assembly contemplated by the present disclosure is shown. The mounting assembly 250 may include a brace assembly 252 and a mounting bracket 80. In another embodiment, the mounting assembly 250 contemplated by the present disclosure may include a brace assembly 252, a mounting bracket 80 and an electrical box 100. The mounting bracket 80 and electrical box 100 of this exemplary embodiment are the same as the mounting bracket 80 and electrical box 100 described above, such that the same reference numerals are used, and a description thereof is not repeated. The mounting bracket 80 is used to releasably attach the electrical box 100 to the hangar body 14 of the brace assembly 252.

In this exemplary embodiment, the brace assembly 252 is similar to the brace assembly 12 described above such that like reference numerals are used. In this exemplary embodiment, the brace assembly 252 is adjustable so that the brace assembly 252 can span between flanges 200 of two parallel engineered joist 210, seen in FIG. 18, and to be secured to the flanges 200 using tension forces applied by end caps 20 and 50. More specifically, each end cap 20 and 50 of the brace assembly 252 applies a force F1 or F2 in a direction away from a center of the brace assembly 252 toward their respective flange 200 of the engineered joist 210.

Figure 18:
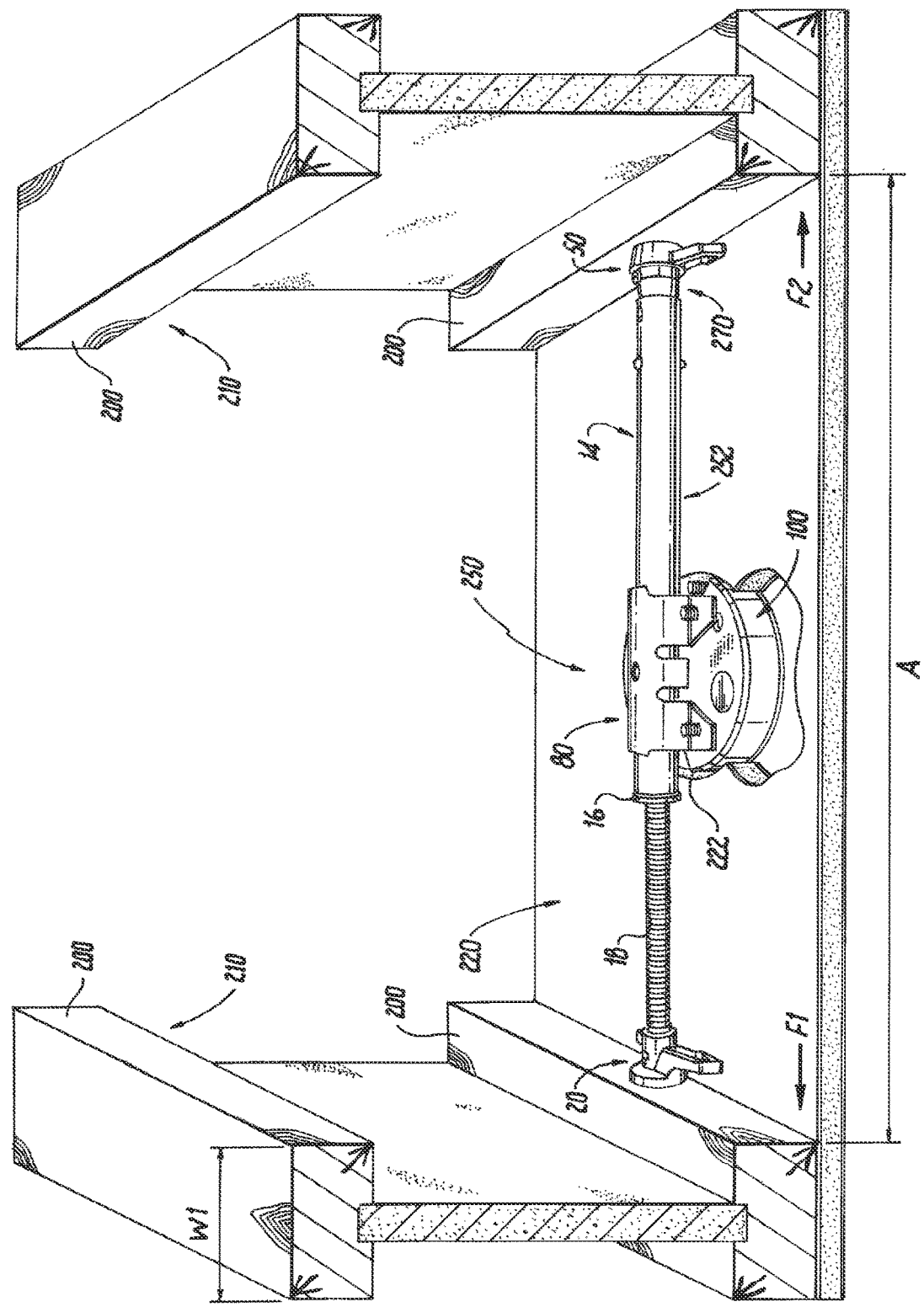
FIG. 18 is a perspective view of parallel engineered joists with another exemplary embodiment of an electrical fixture mounting assembly according to the present disclosure mounted between flanges of each engineered joist with a low profile electrical box extending through a ceiling attached to the joints.
Figure 19:
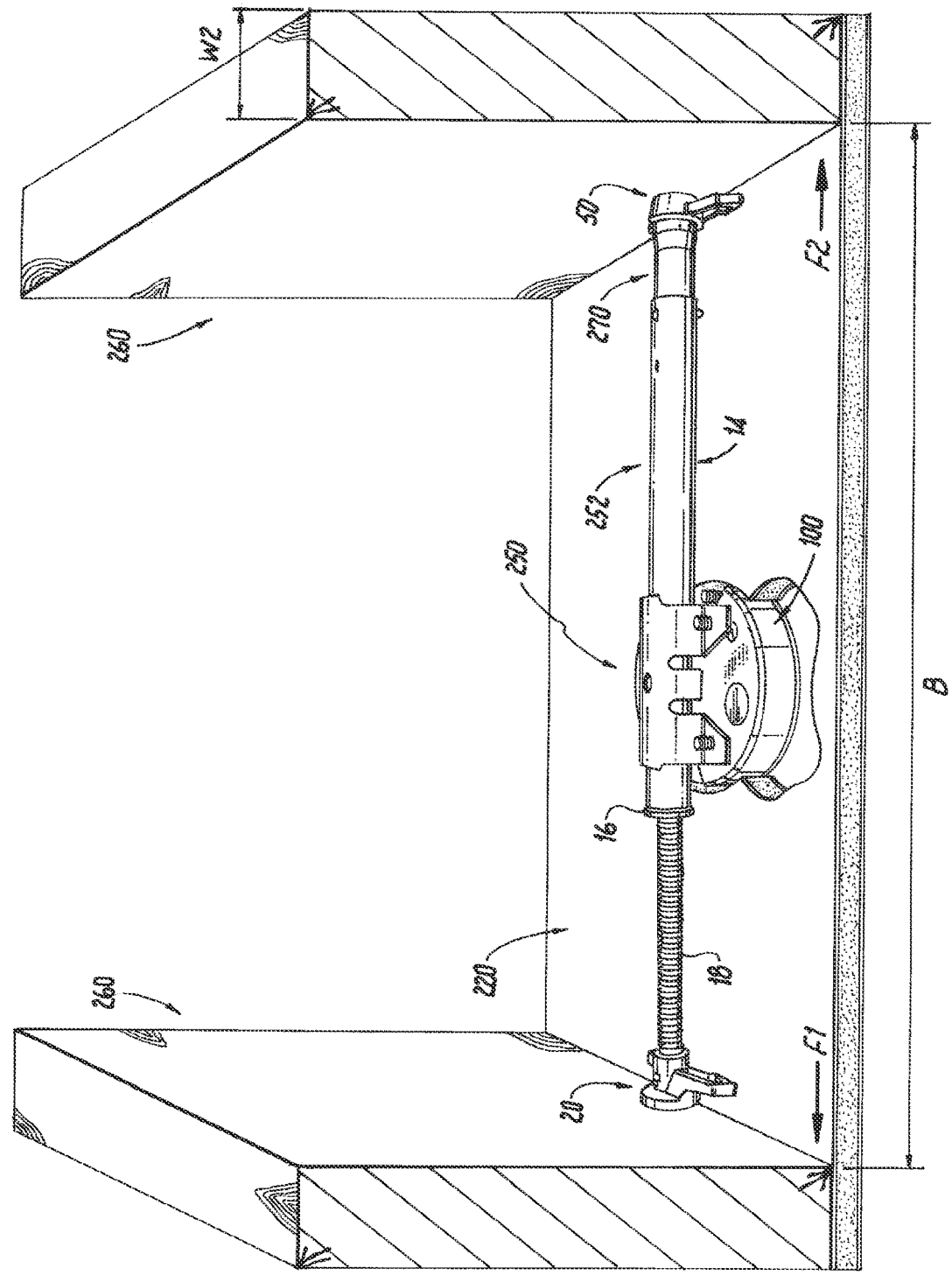
FIG. 19 is a perspective view of parallel solid joists with the electrical fixture mounting assembly of FIG. 18 mounted between the solid joists with a low profile electrical box extending through a ceiling attached to the joists.

It is noted that the width "W1" seen in FIG. 18 of the flanges 200 of engineered joists 210 is wider than the width "W2" seen in FIG. 19 of the solid joists 260. As a result, the spacing "A" between the flanges 200 of adjacent engineered joists 210 is less than the spacing "B" between adjacent solid joists 260, seen in FIGS. 18 and 19. To address this spacing delta, the brace assembly 252 also includes an extension assembly 270 that is selectively movable between a retracted position and an extended position. By moving the extension assembly 270 to the extended position, the length of the brace assembly 252 can be increased so that the brace assembly 252 can span between two parallel solid joists 260, and then secured to the solid joists 260, as seen in FIG. 19. As described above, the brace assembly 252 can be secured to the solid joists 260 using tension forces where each end cap 20 and 50 of the brace assembly 252 applies a force "F1" or "F2" in a direction away from a center of the brace assembly 252 toward their respective solid joist 260. The force "F1" and "F2" needed to support an electrical fixture (not shown) depends upon the load the brace assembly 252 is to support.

Figure 20:
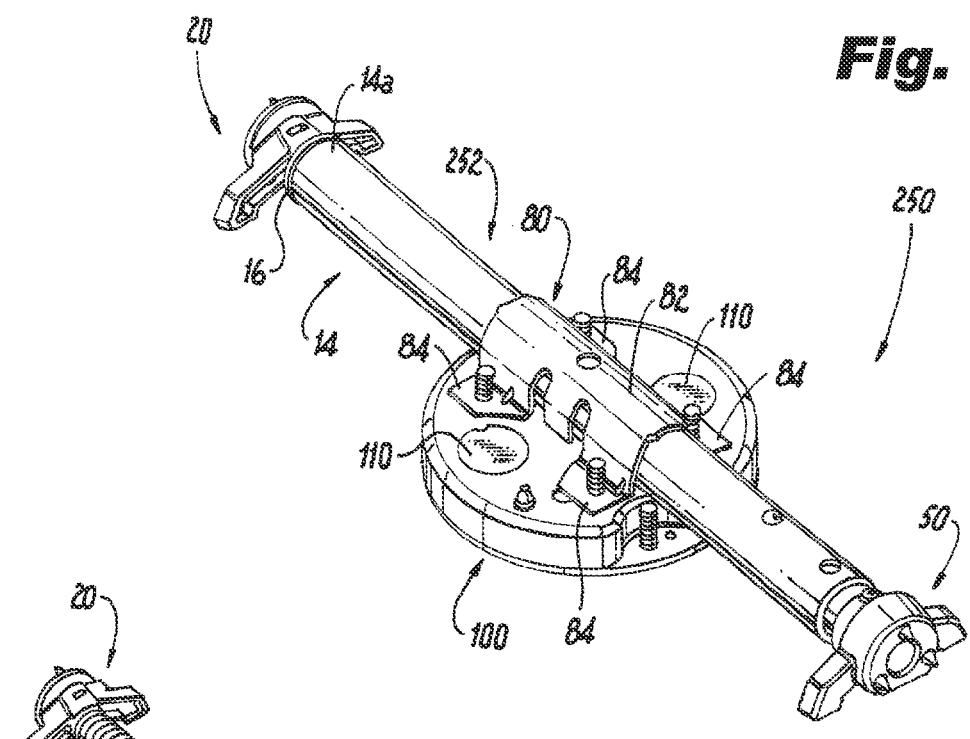
FIG. 20 is a perspective view of the electrical fixture mounting assembly of FIG. 18, illustrating a brace assembly of the electrical fixture mounting assembly in a retracted position and an extension assembly of the electrical fixture mounting assembly in a retracted position.
Figure 21:
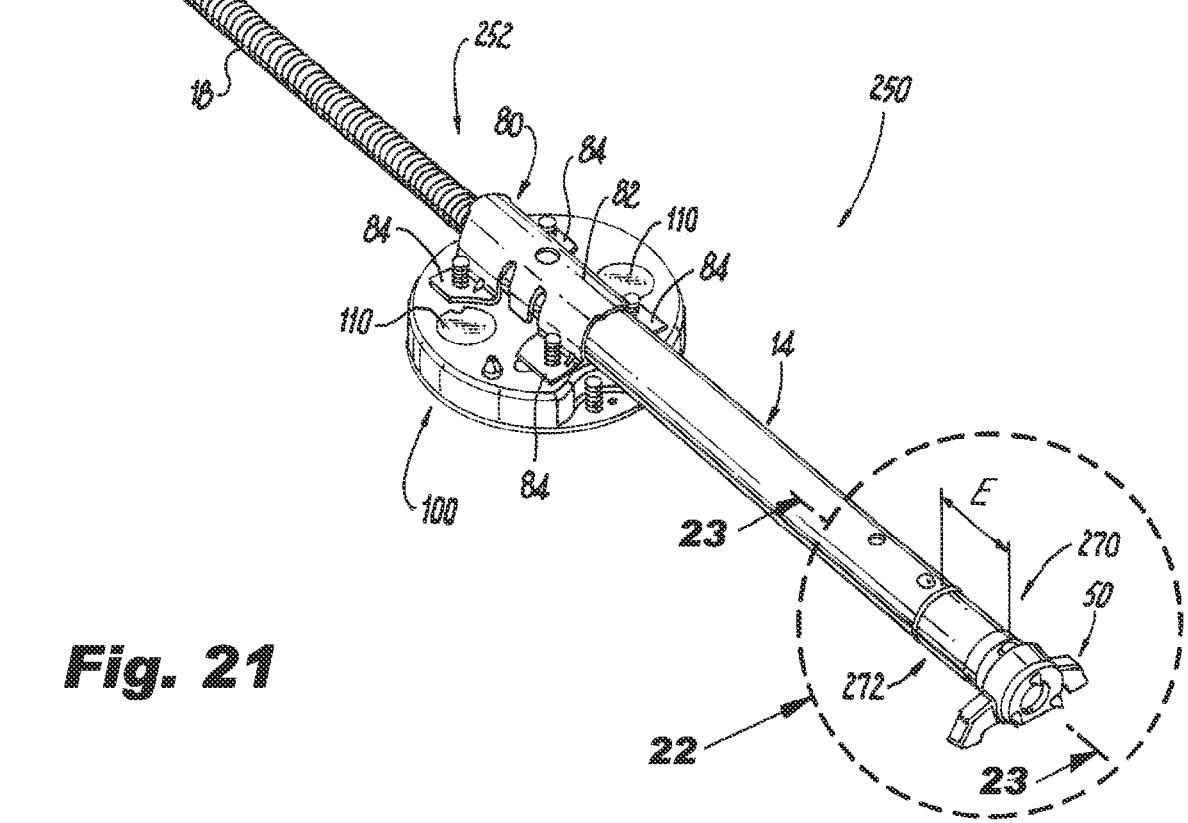
FIG. 21 is a perspective view of the electrical fixture mounting assembly of FIG. 20, illustrating the brace assembly in an extended position and the extension assembly in an extended position.

Referring to FIGS. 20 and 21, the brace assembly 252 includes a hangar body 14, a plug 16, an adjustment member 18, a fixed end cap 20 and a swivel end cap 50, which are described in detail hereinabove such that like reference numerals are used. The hanger body 14 is preferably an elongated member that may be hollow, solid, or partially hollow and partially solid. In the exemplary embodiment shown, the hanger body 14 is a substantially cylindrical hollow tube that can receive the adjustment member 18, which in this embodiment is a threaded rod. It is noted that while the adjustment member 18 is described herein as a mechanical structure, e.g., a threaded rod, the present disclosure contemplates other structures may be used for the adjustment member 18, such as pneumatic or hydraulic structures. The plug 16 is secured to and at least partially within one end, e.g., the first end 14a, of the hanger body 14. The plug 16 is configured and dimensioned to operatively interact with the adjustment member 18 so that the adjustment member 18 and hanger body 14 are movable relative to each other between an extended position and a retracted position which is shown in FIGS. 20 and 21. The retracted position of the brace assembly 252 is when the adjustment member 18 is substantially within the hanger body 14, as seen in FIG. 20. The extended position of the brace assembly 252 may vary depending upon the span between the engineered joists 210 or the solid joists 260. For example, if the joists 210 or 260 are spaced apart at about 24" on center, seen in FIGS. 18 and 19, the extended position of the brace assembly 252 may range from about 20 inches to about 22.5 inches. As another example, if the joists 210 or 260 are spaced apart at about 16" on center, the extended position of the brace assembly 252 may range from about 12_inches to about 14.5 inches. In the exemplary embodiment shown, the plug 16 is a cylindrical member configured and dimensioned to fit within first end 14a of the hanger body 14. The plug 16 includes an opening 17, seen in FIG. 5, that is configured to operatively interact with the adjustment members 18. The plug 16 may be secured to the hanger body 14 by, for example, a press fit, adhesives or mechanical fasteners. In the exemplary embodiment shown, the plug 16 is a cylindrical member having an outer diameter that is slightly greater than the inner diameter of the hanger body 14 so that the plug 16 can be press fit to the first end 14a of the hanger body.

Figure 22:
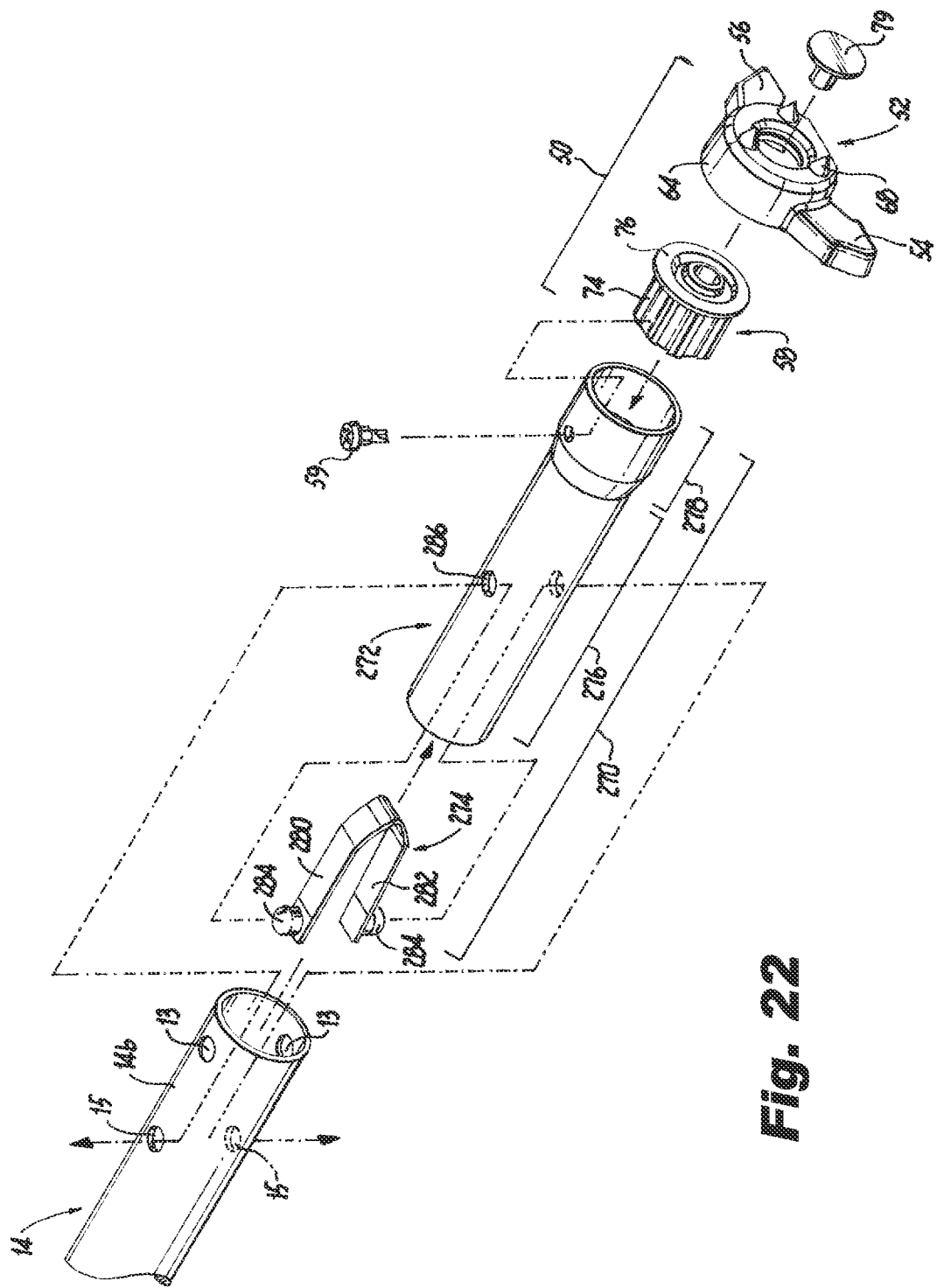
FIG. 22 is an exploded view of a portion of the exemplary embodiment of the brace assembly of FIG. 21 taken from detail 22, illustrating the extension assembly used for selectively extending the length of the brace assembly.
Figure 23:
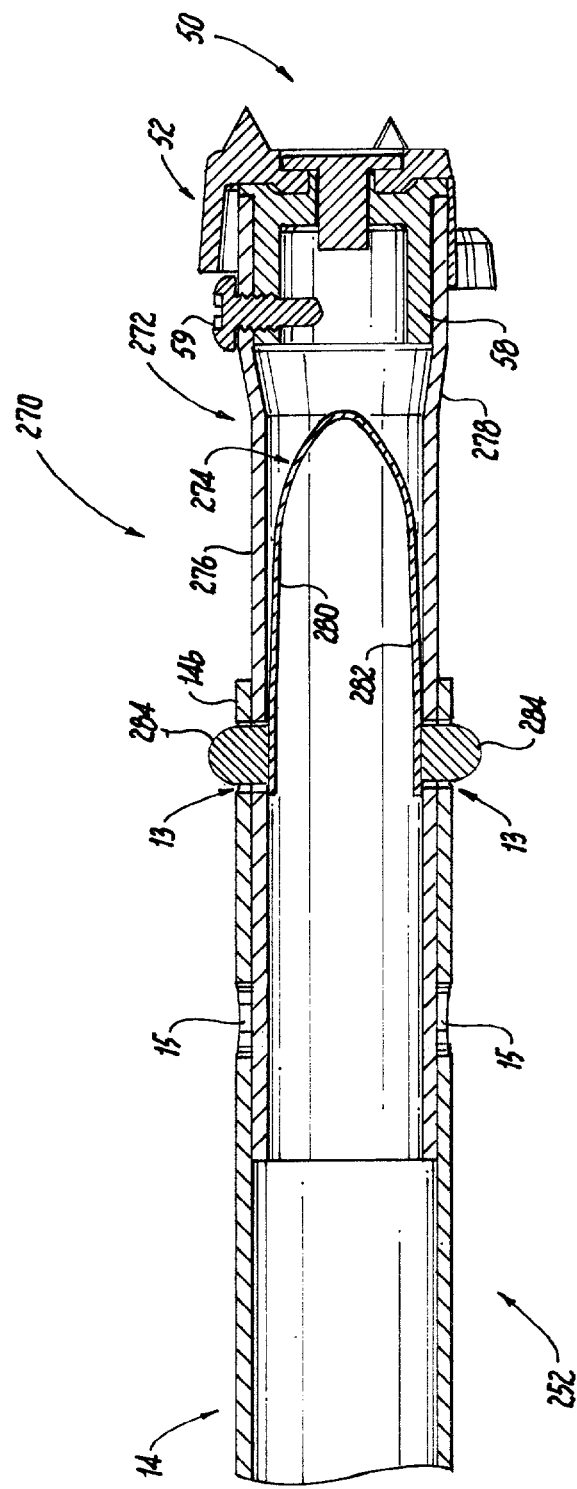
FIG. 23 is a cross-sectional view of the portion of the brace assembly of FIG. 21 taken from line 23-23, illustrating the extension assembly in the extended position.
Figure 24:
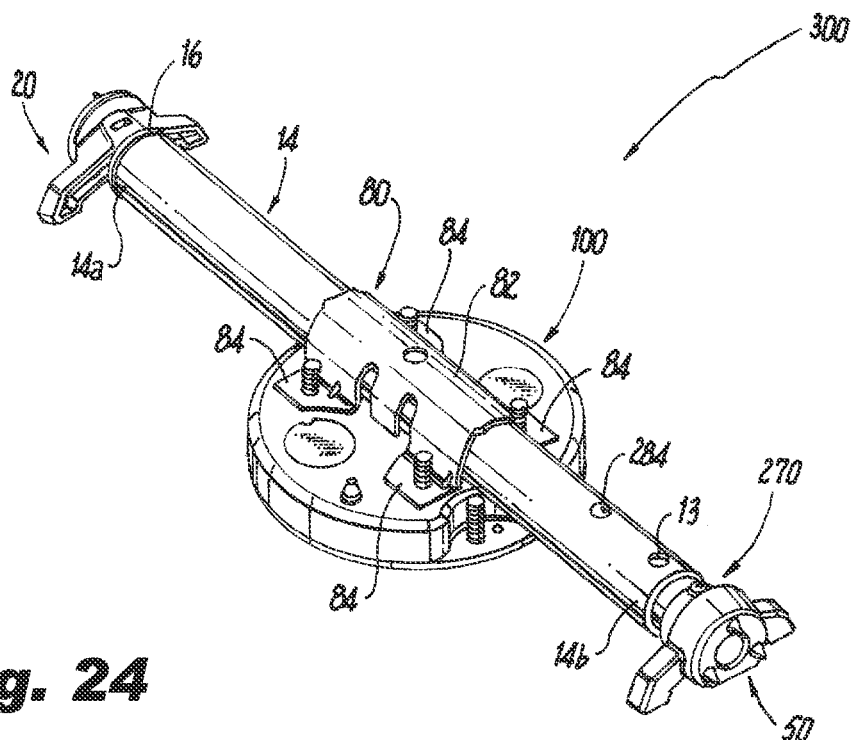
FIG. 24 is a perspective view of another exemplary embodiment of an electrical fixture mounting assembly according to the present disclosure, illustrating a brace assembly of the electrical fixture mounting assembly in a fixed retracted position and an extension assembly electrical fixture mounting assembly in a retracted position.
Figure 25:
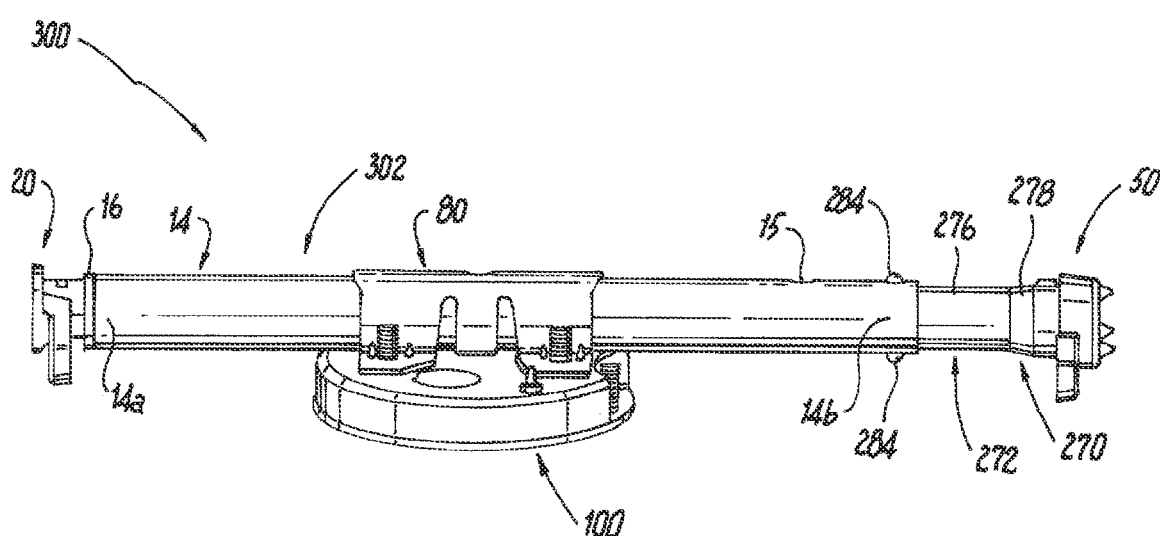
FIG. 25 is a perspective view of the electrical fixture mounting assembly of FIG. 24, illustrating the brace assembly in the fixed retracted position and the extension assembly in an extended position.

Referring now to FIGS. 21-23, an exemplary embodiment of an extension assembly according to the present disclosure is shown. In this exemplary embodiment the extension assembly 270 includes an extension member 272 and a locking member 274. The extension member 272 in this exemplary embodiment has an extension body 276 and a coupler 278. The extension body 276 may be hollow, solid, or partially hollow and partially solid. In the exemplary embodiment shown, the extension body 276 is a substantially cylindrical hollow tube that is configured and dimensioned to fit within the second end 14b of the hanger body 14. The extension body 276 moves within the second end 14b of the hanger body 14 between a retracted position, seen in FIG. 20, and an extended position, seen in FIG. 21.

Continuing to ref to FIG. 22, the coupler 278 of the extension assembly 270 in this exemplary embodiment is a substantially cylindrical hollow tube that has an outer diameter that is preferably greater that the inner diameter of the second end 14b of the hanger body 14 so that the coupler 278 acts as a stop to prevent the extension member 272 from being inserted completely into the hanger body 14. An inner diameter of the coupler 278 is configured and dimensioned to receive the mounting member 58 of the end cap 50, as shown in FIG. 22. The locking member 274 of the extension member 270 is in this exemplary embodiment a push button telescoping tube lock with two legs 280 and 282 bent to form a spring and one or more pins 284 extending from one or both the legs 280 and 282. In the exemplary embodiment shown, each leg 280 and 282 has a single pin 284 extending from the leg. The locking member 274 is positioned within the extension body 276 so that the pins 284 extend out of pin holes 286 in opposite sides of the extension body 276. The extension body 276 is then inserted into the second end 14*b* of the hanger body 14, and the pins 284 are depressed to permit the extension body 276 to move further into the hanger body 14. When the extension body 276 is within the hanger body 14, the pins 284 can then be aligned with pin holes 13 or 15 in the hanger body 14 to lock the extension assembly 270 in the extended position, as shown in FIG. 23, or the retracted position, as shown in FIG. 20.

It is noted that the retracted position of the extension assembly 270 is when the extension body 276 is substantially within the hanger body 14 such that the end cap 50 is adjacent the second end 14*b* of the hanger body 14. The extended position of the extension assembly 270 is when the end cap 50 is positioned away from the second end 14*b* of the hanger body 14 a predefined distance "E" as seen in FIG. 21. The predefined distance "E" is a distance sufficient for the brace assembly 250 to make up the delta of the spacing between flanges 200 of adjacent engineered joists 210 and the spacing between adjacent solid joists 260. For example, if the joists 210 or 260 are spaced apart at about 24" on center, seen in FIGS. 18 and 19, the extended position of the extension assembly 270 may range from about 1 inch to about 2.5 inches.

Turning now to FIGS. 24-27, another exemplary embodiment of a mounting assembly contemplated by the present disclosure is shown. The mounting assembly 300 may include a brace assembly 302 and a mounting bracket 80. In another embodiment, the mounting assembly 300 contemplated may include a brace assembly 302, a mounting bracket 80 and an electrical box 100. The mounting bracket 80 and electrical box 100 of this exemplary embodiment are the same as the mounting bracket 80 and electrical box 100 described above, such that the same reference numerals are used and a description thereof is not repeated. The mounting bracket 80 is used to releasably attach the electrical box 100 to the hangar body 14 of the brace assembly 302.

Figure 26:
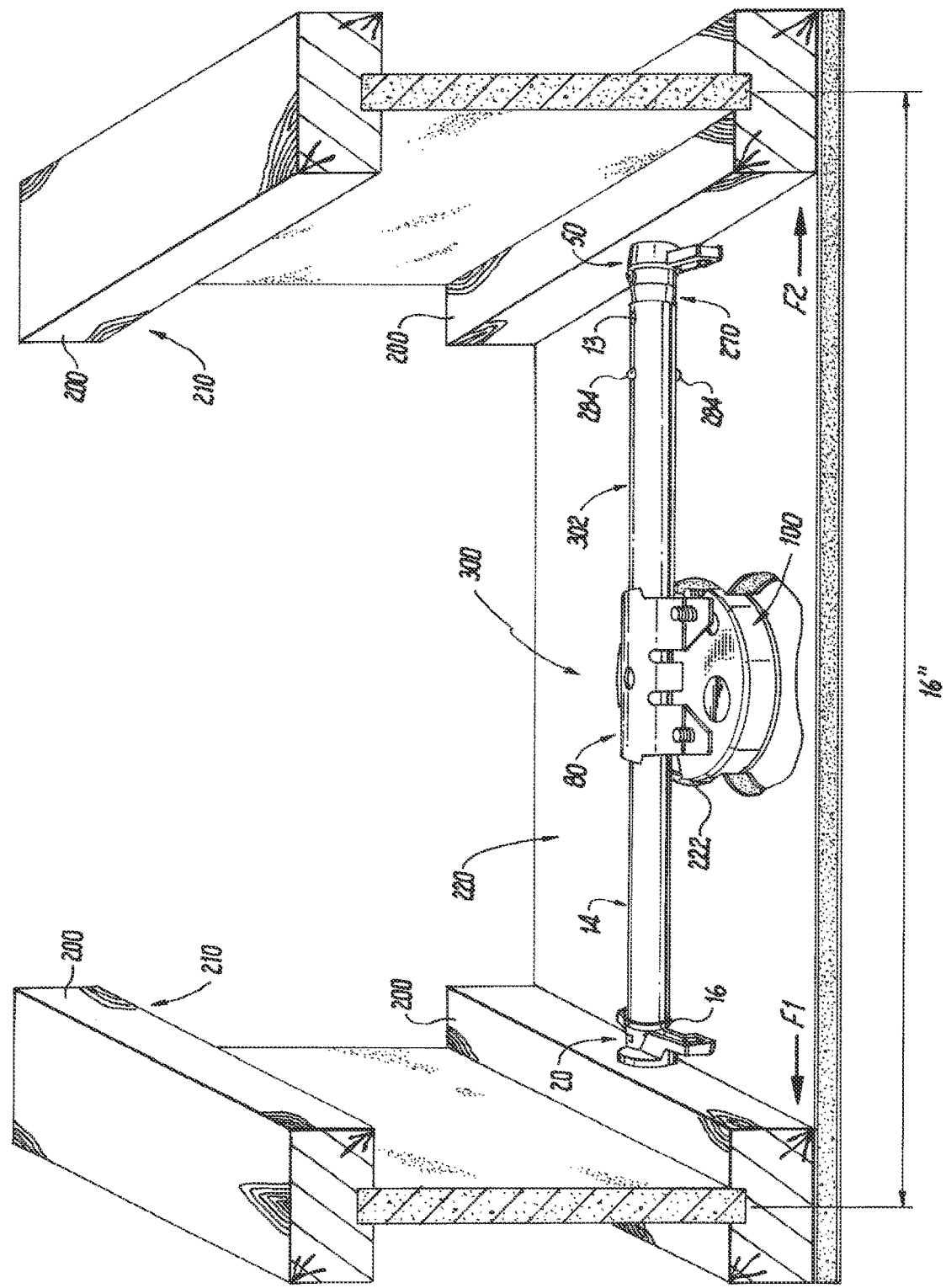
FIG. 26 is a perspective view of parallel engineered joists with the exemplary embodiment of the electrical fixture mounting assembly of FIG. 24 mounted between flanges of each engineered joist, with the brace assembly in the fixed retracted position and the extension assembly in the retracted position to fit between the engineered joists.
Figure 27:
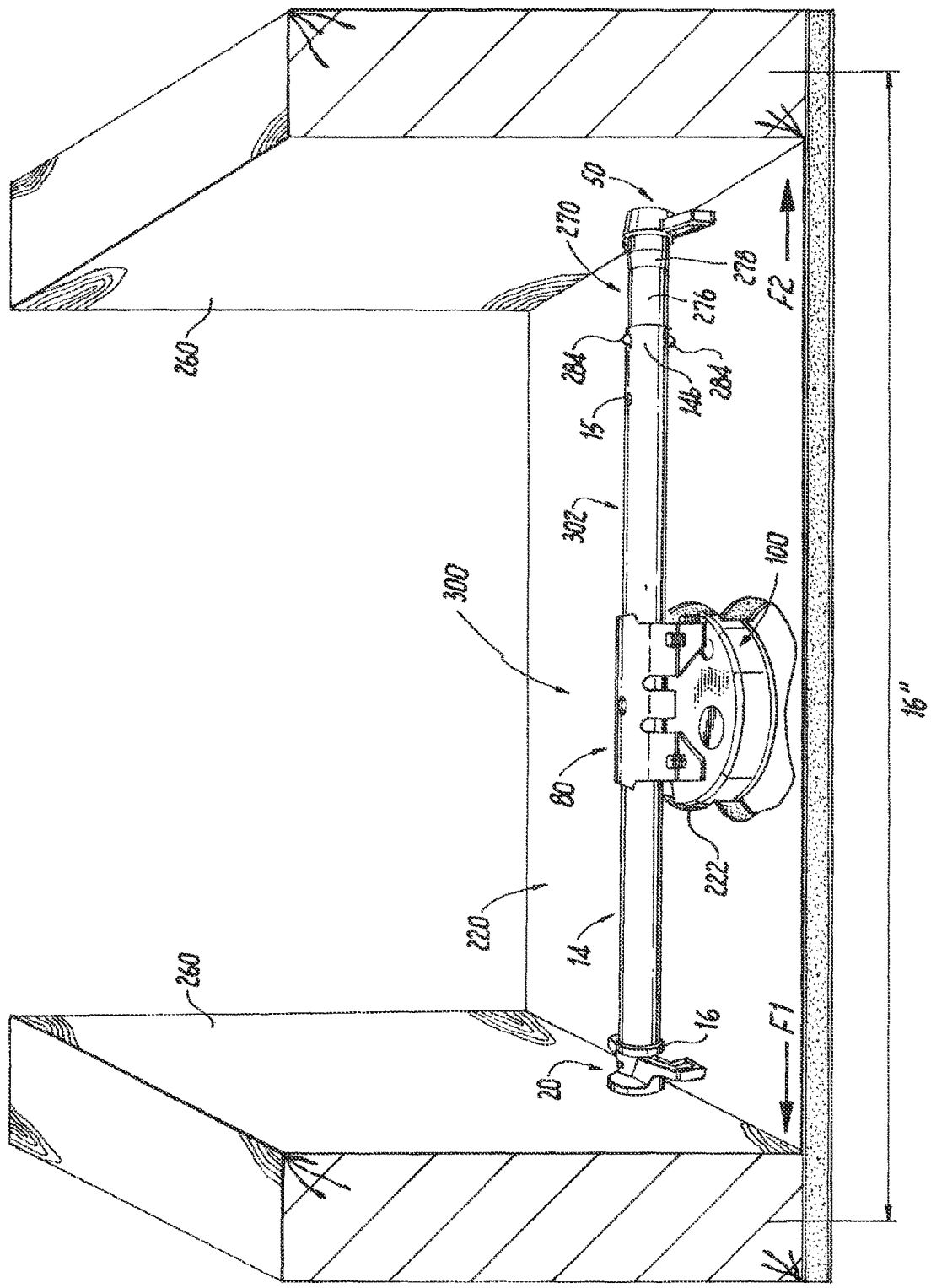
FIG. 27 is a perspective view of parallel solid joists with the exemplary embodiment of the electrical fixture mounting assembly of FIG. 24 mounted between the solid wood joists, with the brace assembly in the fixed retracted position and the extension assembly in the extended position to fit between the solid joists.

In this exemplary embodiment, the brace assembly 302 is similar to the brace assembly 12 described above such that like reference numerals are used. However, in this exemplary embodiment, the brace assembly 302 is not adjustable such that there is no adjustment member 18 and the end cap 20 is attached to the plug 16 which is attached to the first end 14*a* of the hanger body 14. In this configuration, the length of the hanger body 14 is fixed so that brace assembly 302 can fit between the flanges 200 of two parallel engineered joists 210 with a predefined spacing such as 16" or 24" on center. As shown in FIG. 26, the brace assembly 302 is positioned between the flanges 200 of two parallel engineered joists 210 spaced apart at 16" on center. As described herein, the brace assembly 302 is secured to the flanges 200 using tension forces applied by end caps 20 and 50. More specifically, each end cap 20 and 50 of the brace assembly 302 applies a force F1 or F2 in a direction away from a center of the brace assembly 302 toward their respective flange 200 of the engineered joists 210 when the hanger body 14 is rotated. To secure the brace assembly 302 between solid joists 260, the extension assembly 270 is selectively moved from the retracted position to the extended position to extend the length of the brace assembly 302. By extending the extension assembly 270, the length of the brace assembly 302 is increased so that the brace assembly 302 can span between the two parallel solid joists 260. The brace assembly 270 is secured to the solid joists 260, seen in FIG. 27, using tension forces where each end cap 20 and 50 of the brace assembly 302 applies a force F1 or F2 in a direction away from a center of the brace assembly 302 toward their respective solid joist 260. The force needed to support an electrical fixture (not shown) depends upon the load the brace assembly 302 is to support.

Figure 28:
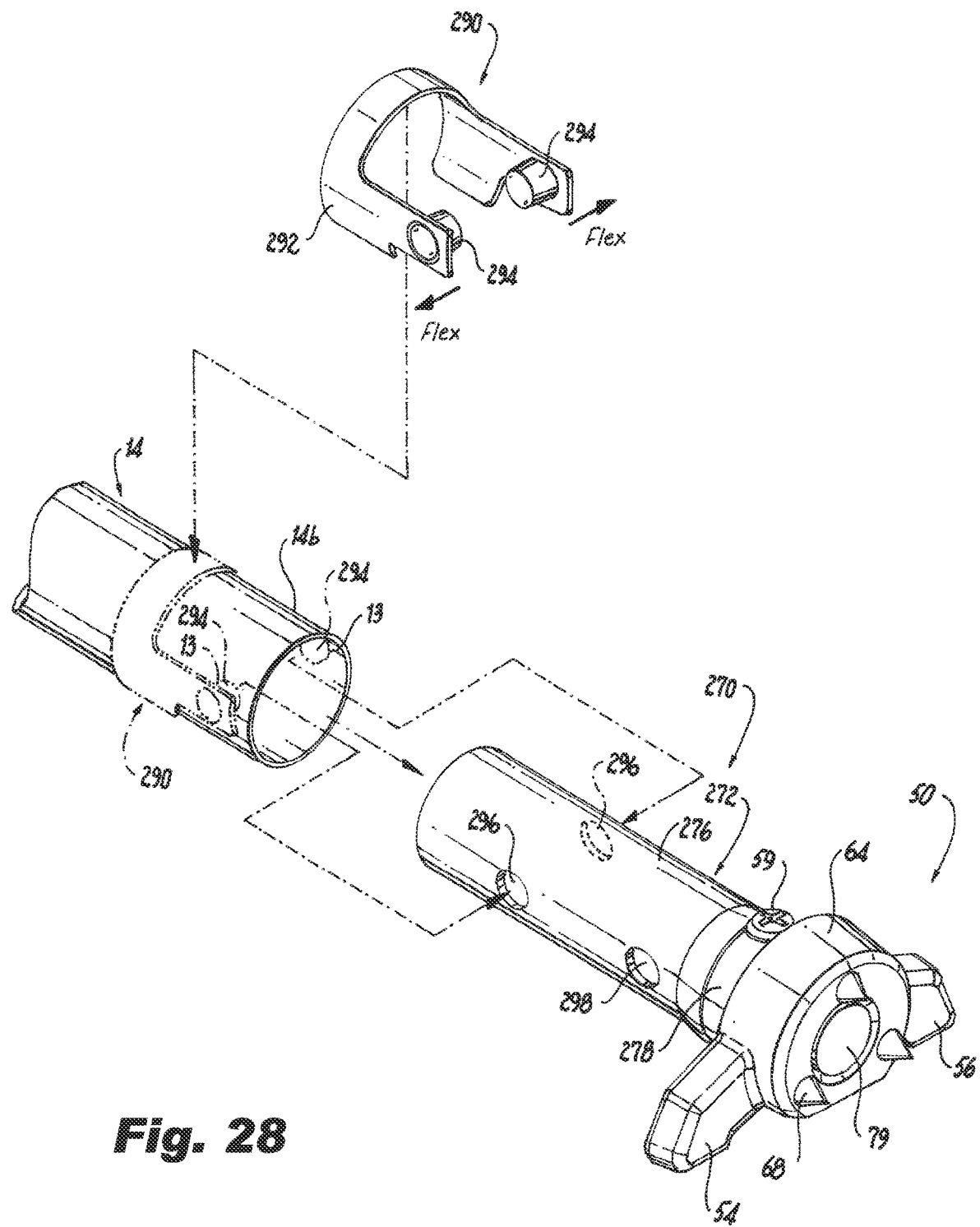
FIG. 28 is an exploded perspective view of another exemplary embodiment of an extension assembly according to the present disclosure, illustrating an external locking member for locking the extension assembly in the extended position.
Figure 29:
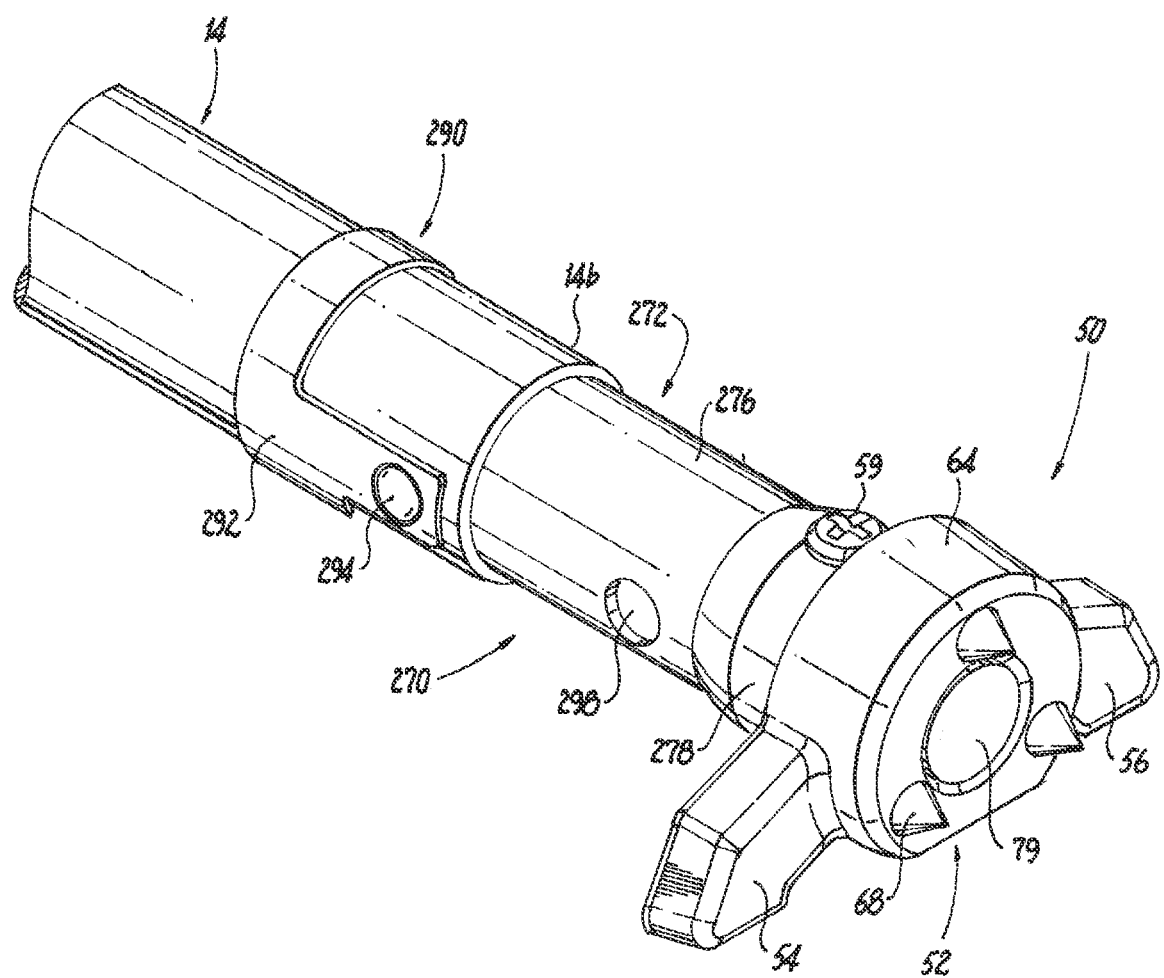
FIG. 29 is a perspective view of the extension assembly of FIG. 28, illustrating the external locking member locking the extension assembly in the extended position.

Referring to FIGS. 28 and 29, another exemplary embodiment of the locking member of the extension member 270 is shown. In this exemplary embodiment, the locking member 290 is a snap clip having a clip body 292 and one or more pins 294 extending from the clip body 292. The clip body 292 is a substantially U-shaped body that is flexible so that the clip body 292 can flex outwardly as the clip body 292 is being positioned over the second end 14*b* of the hanger body 14 of the brace assembly 302. As the clip body 292 is being positioned over the second end 14*b* of the hanger body 14 the one or more pins 294 are positioned into pin holes 13 in the hanger body 14 and into pin holes 296 or 298 in the extension body 276. When the extension body 276 is within the hanger body 14 so that the pins 294 on the clip body 290 are inserted into pin holes 13 in the hanger body 14 and the pin holes 296 in the extension body 276, the extension assembly 270 is locked in the extended position, as shown in FIG. 29. When the extension body 276 is within the hanger body 14 so that the pins 294 on the clip body 290 are inserted into the pin holes 13 in the hanger body 14 and the pin holes 298 in the extension body 276, the extension assembly 270 is locked in the retracted position.

It is noted that the retracted position of the extension assembly 270 is when the extension body 276 is substantially within the hanger body 14 such that the end cap 50 is adjacent the second end 14*b* of the hanger body 14. The extended position of the extension assembly 270 is when the end cap 50 is positioned away from the second end 14*b* of the hanger body 14 a predefined distance "E" which is described above. The predefined distance "E" is a distance sufficient for the brace assembly 300 to make up a delta in the spacing between flanges 200 of adjacent engineered joists 210 and the spacing between adjacent solid joists 260. For example, if the joists 210 or 260 are spaced apart at about 24" on center, the extended position of the extension assembly 270 may range from about 1 inch to about 2.5 inches.

Figure 30:
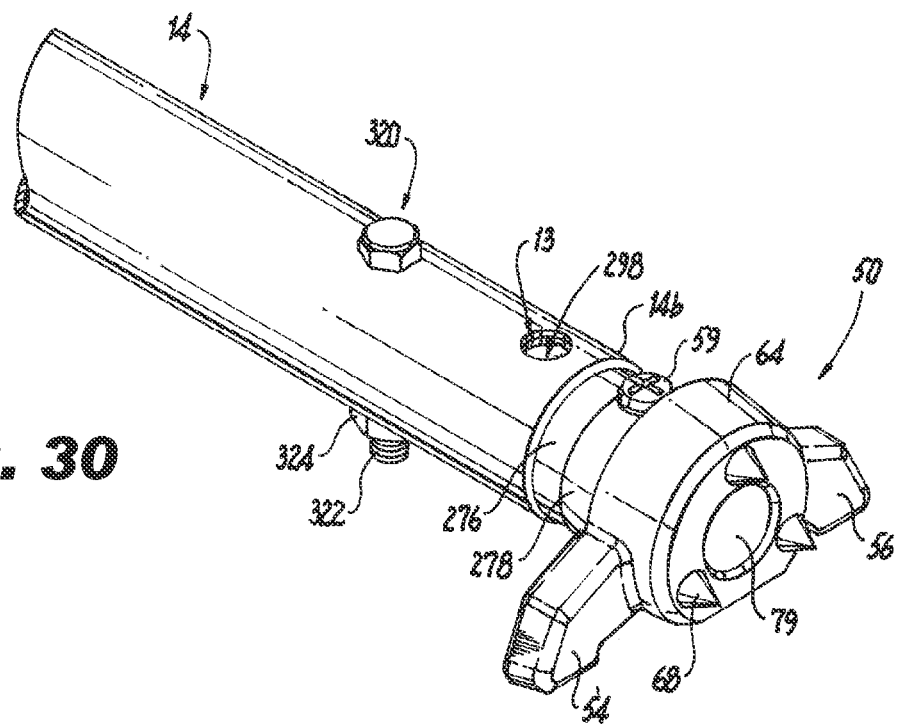
FIG. 30 is a perspective view of another exemplary embodiment of an extension assembly according to the present disclosure, illustrating a mechanical fastener as the locking member locking the extension assembly in the retracted position.
Figure 31:
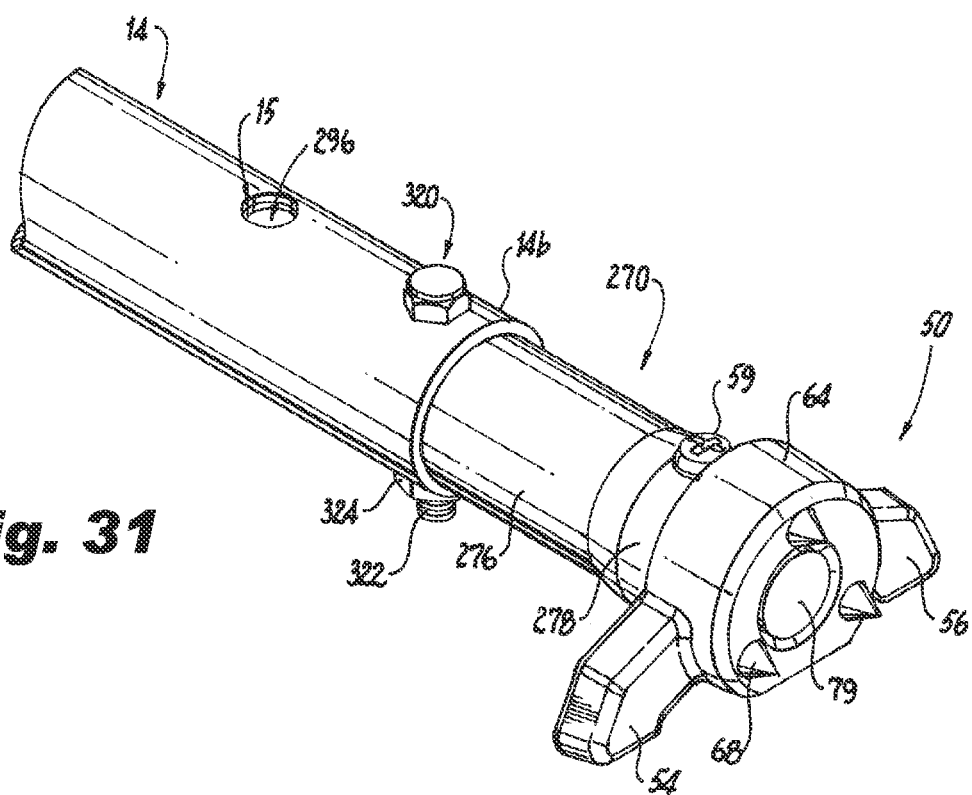
FIG. 31 is a perspective view of the extension assembly according of FIG. 30, illustrating the mechanical fastener locking the extension assembly in the extended position.
Figure 32:
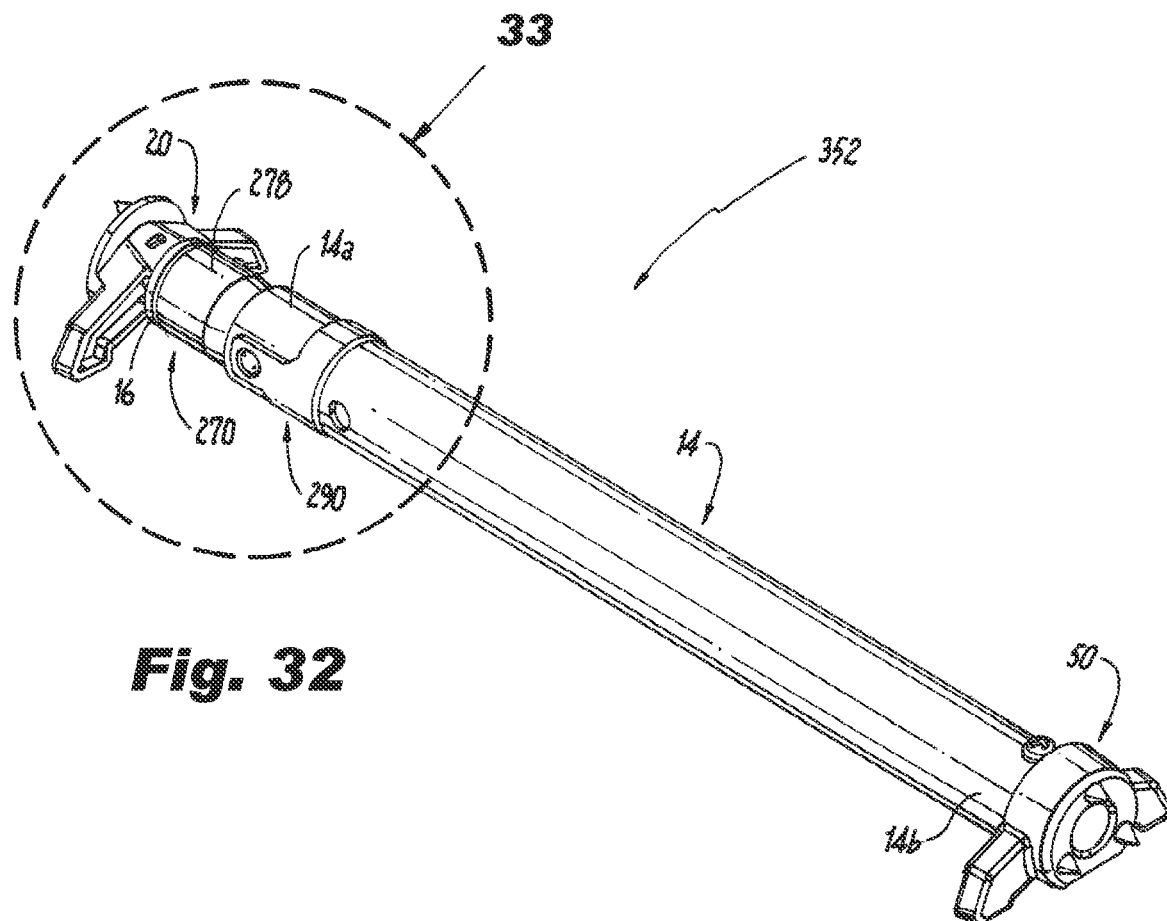
FIG. 32 is a perspective view of another exemplary embodiment of a brace assembly according to the present disclosure, illustrating the brace assembly in a retracted position and the extension assembly in a retracted position.
Figure 33:
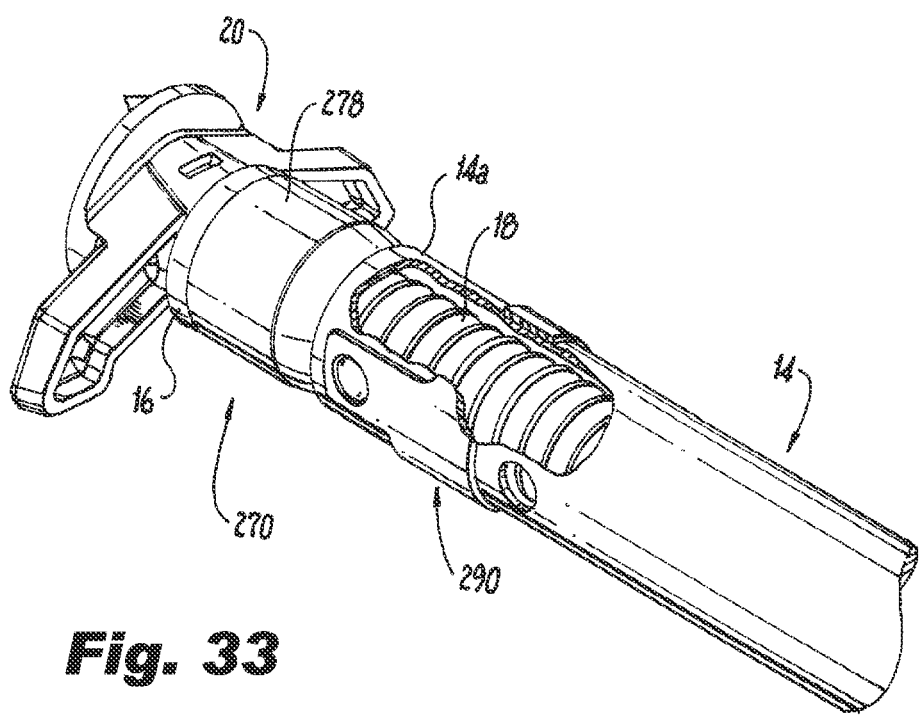
FIG. 33 is a perspective view and the brace assembly of FIG. 32 taken from detail 33, illustrating a plug of the brace assembly attached to the extension assembly.

Referring to FIGS. 30 and 31, another exemplary embodiment of the locking member of the extension member 270 is shown. In this exemplary embodiment, the locking member 274 is a mechanical fastener. In the exemplary embodiment shown, the mechanical fastener is a bolt 322 and a nut 324. When the extension body 276 is within the hanger body 14 so that the pin holes 15 in the hanger body 14 are aligned with the pin holes 296 in the extension body 276, the extension assembly 270 is locked in the retracted position, as shown in FIG. 30. When the extension body 276 is within the hanger body 14 so that the pin holes 13 in the hanger body 14 are aligned with the pin holes 298 in the extension body 276, the extension assembly 270 is locked in the extended position, as shown in FIG. 31.

Turning now to FIGS. 32-35, another exemplary embodiment of a brace assembly according to the present disclosure is shown. In this exemplary embodiment, the brace assembly 352 is similar to the brace assembly 12 described above, such that like reference numerals are used. In this exemplary embodiment, the brace assembly 352 is adjustable so that the brace assembly 352 can span between flanges 200 of two parallel engineered joist 210, similar to that seen in FIG. 18, and can be secured to the flanges 200 using tension forces applied by end caps 20 and 50 as described hereinabove. The brace assembly 352 also includes an extension assembly 270 that is selectively movable between the retracted position and the extended position to extend the length of the brace assembly 352. In this exemplary embodiment, the extension assembly is positioned at the first end 14a of the hanger body 14 instead of the second end 14b of the hanger body 14. By extending the extension assembly 270, the length of the brace assembly 352 can be increased so that the brace assembly 352 can span between two parallel solid joists 260 and can be secured to the solid joists 260 using tension forces applied by the end caps 20 and 50 as described hereinabove. As noted, the force needed to support an electrical fixture depends upon the load the brace assembly 352 is to support.

Figure 34:
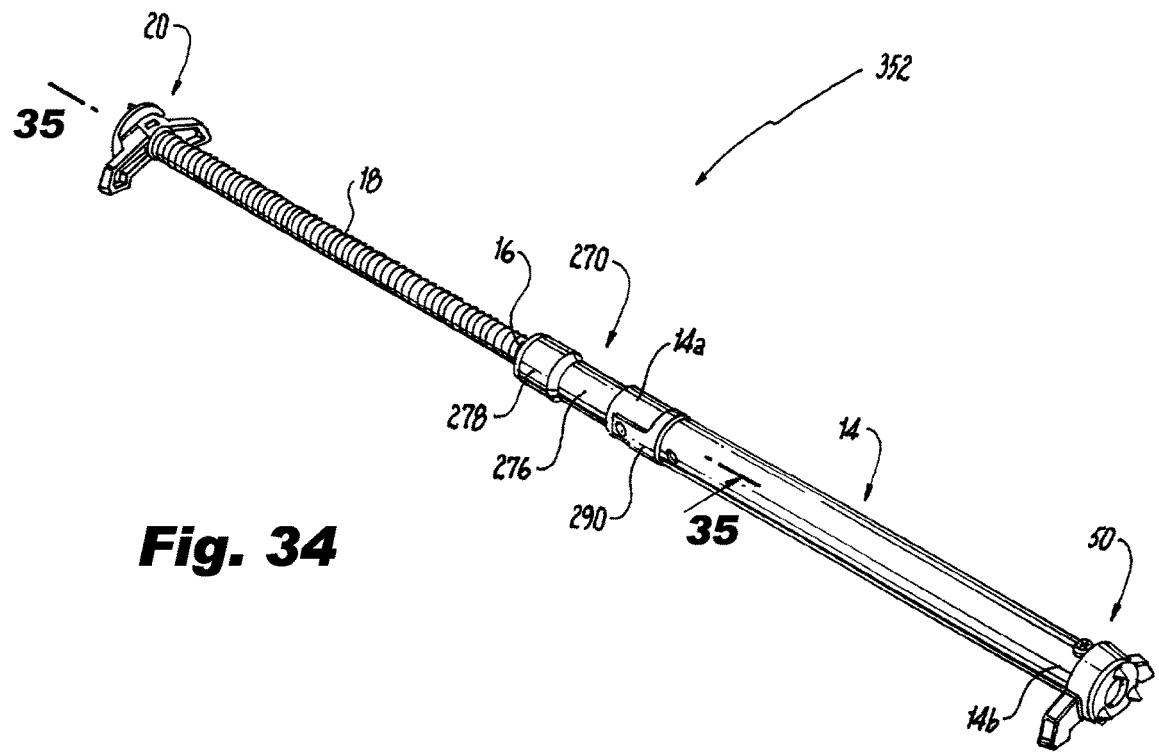
FIG. 34 is a perspective view of the electrical fixture mounting assembly of FIG. 32, illustrating the brace assembly in an extended position and the extension assembly in an extended position.
Figure 35:
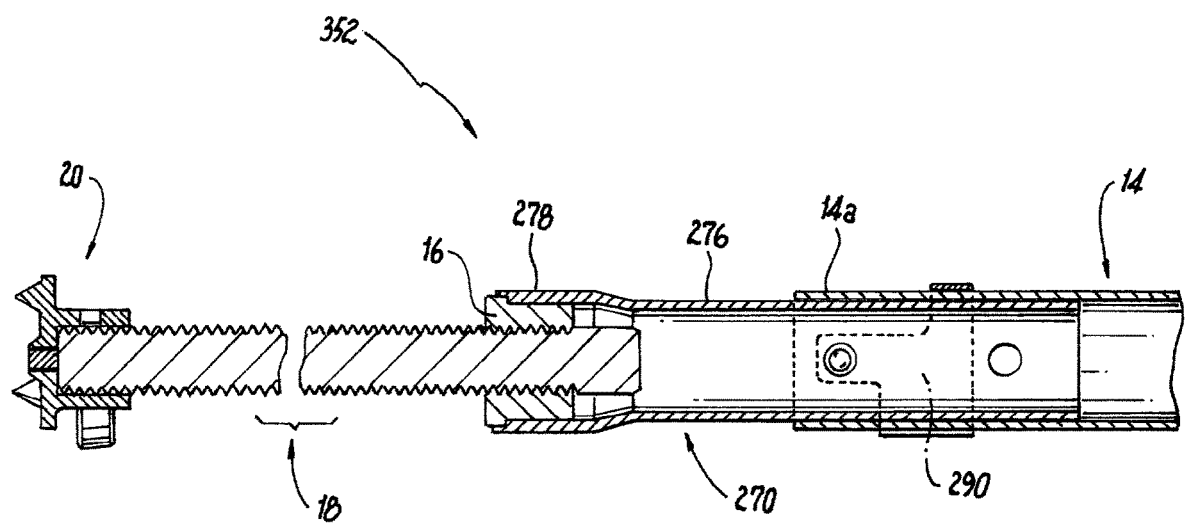
FIG. 35 is cross-sectional view of the brace assembly of FIG. 34 taken from line 35-35.

Referring to FIGS. 34 and 35, the brace assembly 352 includes a hangar body 14, a plug 16, an adjustment member 18, a fixed end cap 20 and a swivel end cap 50, which are described in detail hereinabove such that like reference numerals are used. The hanger body 14 is preferably an elongated member that may be hollow, solid, or partially hollow and partially solid. In the exemplary embodiment shown, the hanger body 14 is a substantially cylindrical hollow tube that can receive the adjustment member 18, which in this embodiment is a threaded rod. It is noted that while the adjustment member 18 is described herein as a mechanical structure, e.g., a threaded rod, the present disclosure contemplates other structures may be used for the adjustment member 18, such as pneumatic or hydraulic structures. In this exemplary embodiment, the plug 16 is secured to and at least partially within the coupler 278 of the extension assembly 270. The plug 16 is configured and dimensioned to operatively interact with the adjustment member 18 so that the adjustment member 18 and hanger body 14 are movable relative to each other between an extended position and a retracted position which is similar to that shown in FIGS. 20 and 21. The retracted position of the brace assembly 352 is when the adjustment member 18 is substantially within the hanger body 14, similar to that shown in FIG. 20. The extended position of the brace assembly 352 may vary depending upon the span between the engineered joists 210 or the solid joists 260. For example, if the joists 210 or 260 are spaced apart at about 24" on center, seen in FIGS. 18 and 19, the extended position of the brace assembly 352 may range from about 12 inches to about 14.5 inches.

As described above, the plug 16 is a cylindrical member configured and dimensioned to fit within the coupler 278 of the extension assembly 270. The plug 16 includes an opening 17 configured to operatively interact with the adjustment member 18. The plug 16 may be secured to the coupler 278 by, for example, a press fit, adhesives or mechanical fasteners. In the exemplary embodiment shown, the plug 16 is a cylindrical member having an outer diameter that is slightly greater than the inner diameter of the coupler 278 so that the plug 16 can be press fit to the coupler 278 of the extension assembly 270.

In this exemplary embodiment, the locking member 290 of the extension assembly 270 is preferably the snap clip having the clip body 292 and one or more pins 294 extending from the clip body as described above. When the extension body 276 is within the first end 14a of the hanger body 14 so that the pins 294 on the clip body 290 are inserted into pin the holes 13 in the hanger body 14 and the pin holes 296 in the extension body 276, the extension assembly 270 is locked in the extended position, similar to that shown in FIG. 29. When the extension body 276 is within the first end 14a of the hanger body 14 so that the pins 294 on the clip body 290 are inserted into pin the holes 13 in the hanger body 14 and the pin holes 298 in the extension body 276, the extension assembly 270 is locked in the retracted position.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical fixture mounting assembly comprising:
a brace assembly having a hanger body, a plug positioned at least partially within a first end of the hanger body, an adjustment member operatively coupled to the plug such that rotation of the hanger body causes the adjustment member to move axially relative to the hanger body, a first end cap attached to an end of the adjustment member, and a second end cap attached to an end of an extension assembly operatively coupled to a second end the hanger body such that the hanger body is rotatable relative to the second end cap, the extension assembly being selectively movable between a retracted position and an extended position relative to the hanger body and configured to lock when in the retracted position and when in the extended position;
the first end cap having a first cap body, a first leg and a second leg, wherein the first leg includes a first portion that extends from the first cap body at an angle relative to a vertical axis of the first cap body, and a second portion that extends from the first portion so that a flat bottom surface of the second portion is substantially parallel to a horizontal axis of the first cap body, wherein the second leg includes a first portion that extends at an angle relative to the vertical axis of the first cap body, and a second portion that extends from the first portion of the second leg so that a flat bottom surface of the second portion of the second leg is substantially parallel to the horizontal axis of the first cap body, and wherein a height between the flat bottom surface of the first and second legs and the horizontal axis of the first cap body is in a range of about ½ inch and about 1.0 inch;
the second end cap having a second cap body, a third leg and a fourth leg, wherein the third leg includes a first portion that extends from the second cap body at an angle relative to a vertical axis of the second cap body, and a second portion that extends from the first portion so that a flat bottom surface of the second portion is substantially parallel to a horizontal axis of the second cap body, wherein the fourth leg includes a first portion that extends at an angle relative to the vertical axis of the second cap body, and a second portion that extends from the first portion of the fourth leg so that a flat bottom surface of the second portion of the fourth leg is substantially parallel to the horizontal axis of the second cap body, and wherein a height between the flat bottom surface of the third and fourth legs and the horizontal axis of the first cap body is in a range of about ½ inch and about 1.0 inch;
a mounting bracket mounted to the brace assembly; and
an electrical box releasably secured to the mounting bracket.

2. The electrical fixture mounting assembly according to claim 1, wherein the adjustment member comprises a threaded rod.

3. The electrical fixture mounting assembly according to claim 2, wherein the plug comprises a threaded bore, and wherein the adjustment member is operatively coupled to the plug by threading the threaded rod into the threaded bore.

4. The electrical fixture mounting assembly according to claim 1, wherein the hanger body comprises a substantially cylindrical hollow tube.

5. The electrical fixture mounting assembly according to claim 1, wherein mounting bracket comprises a bracket body and at least one flange extending outwardly from the bracket body.

6. The electrical fixture mounting assembly according to claim 1, wherein the electrical box comprises a round pancake box.

7. The electrical fixture mounting assembly according to claim 1, wherein the electrical box is configured to straddle the hanger body.

8. A brace assembly for mounting an electrical box between engineered joists, the brace assembly comprising:
a hanger body;
a plug positioned at least partially within a first end of the hanger body;
an adjustment member operatively coupled to the plug such that rotation of the hanger body causes the adjustment member to move axially relative to the hanger body;
a first end cap attached to an end of the adjustment member, the first end cap having a first cap body, a first leg and a second leg, wherein the first leg includes a first portion that extends from the first cap body at an angle relative to a vertical axis of the first cap body, and a second portion that extends from the first portion so that a flat bottom surface of the second portion is substantially parallel to a horizontal axis of the first cap body, wherein the second leg includes a first portion that extends at an angle relative to the vertical axis of the first cap body, and a second portion that extends from the first portion of the second leg so that a flat bottom surface of the second portion of the second leg is substantially parallel to the horizontal axis of the first cap body, and wherein a height between the flat bottom surface of the first and second legs and the horizontal axis of the first cap body is in a range of about ½ inch and about 1.0 inch; and
a second end cap attached to an end of an extension assembly operatively coupled to a second end the hanger body such that the hanger body is rotatable relative to the second end cap, the extension assembly being selectively movable between a retracted position and an extended position relative to the hanger body and configured to lock when in the retracted position and when in the extended position, the second end cap having a second cap body, a third leg and a fourth leg, wherein the third leg includes a first portion that extends from the second cap body at an angle relative to a vertical axis of the second cap body, and a second portion that extends from the first portion so that a flat bottom surface of the second portion is substantially parallel to a horizontal axis of the second cap body, wherein the fourth leg includes a first portion that extends at an angle relative to the vertical axis of the second cap body, and a second portion that extends from the first portion of the fourth leg so that a flat bottom surface of the second portion of the fourth leg is substantially parallel to the horizontal axis of the second cap body, and wherein a height between the flat bottom surface of the third and fourth legs is in a range of about ½ inch and about 1.0 inch.

9. The brace assembly according to claim 8, wherein the adjustment member comprises a threaded rod.

10. The brace assembly according to claim 9, wherein the plug comprises a threaded bore, and wherein the adjustment member is operatively coupled to the plug by threading the threaded rod into the threaded bore.

11. The brace assembly according to claim 8, wherein the hanger body comprises a substantially cylindrical hollow tube.

12. An electrical fixture mounting assembly comprising:
a brace assembly having a hanger body, a plug positioned at least partially within a first end of the hanger body, an adjustment member operatively coupled to the plug such that rotation of the hanger body causes the adjustment member to move axially relative to the hanger body, a first end cap attached to an end of the adjustment member, an extension assembly having a first portion configured to fit within the hanger body, the extension assembly being movable between a retracted position and an extended position relative to the hanger body and configured to lock when in the retracted position and when in the extended position, and a second end cap attached to a second portion of the extension assembly such that the extension assembly is rotatable relative to the second end cap;
the first end cap having a first cap body, a first leg and a second leg, wherein the first leg includes a first portion that extends from the first cap body at an angle relative to a vertical axis of the first cap body, and a second portion that extends from the first portion so that a flat bottom surface of the second portion is substantially parallel to a horizontal axis of the first cap body, wherein the second leg includes a first portion that extends at an angle relative to the vertical axis of the first cap body, and a second portion that extends from the first portion of the second leg so that a flat bottom surface of the second portion of the second leg is substantially parallel to the horizontal axis of the first cap body, and wherein a height between the flat bottom surface of the first and second legs and the horizontal axis of the first cap body is in a range of about ½ inch and about 1.0 inch;
the second end cap having a second cap body, a third leg and a fourth leg, wherein the third leg includes a first portion that extends from the second cap body at an angle relative to a vertical axis of the second cap body, and a second portion that extends from the first portion so that a flat bottom surface of the second portion is substantially parallel to a horizontal axis of the second cap body, wherein the fourth leg includes a first portion that extends at an angle relative to the vertical axis of the second cap body, and a second portion that extends from the first portion of the fourth leg so that a flat bottom surface of the second portion of the fourth leg is substantially parallel to the horizontal axis of the second cap body, and wherein a height between the flat bottom surface of the third and fourth legs and the horizontal axis of the first cap body is in a range of about ½ inch and about 1.0 inch;
a mounting bracket mounted to the brace assembly.

13. The electrical fixture mounting assembly according to claim 12, wherein the extension assembly comprises an extension member and a locking member that releasably locks the extension member to the hanger body in the extended position or the retracted position.

14. The electrical fixture mounting assembly according to claim 13, wherein the first portion of the extension member comprises an extension body, and wherein the second portion of the extension member comprises a coupler.

15. The electrical fixture mounting assembly according to claim 12, wherein the adjustment member comprises a threaded rod.

16. The electrical fixture mounting assembly according to claim 15, wherein the plug comprises a threaded bore, and wherein the adjustment member is operatively coupled to the plug by threading the threaded rod into the threaded bore.

17. The electrical fixture mounting assembly according to claim 12, wherein the hanger body comprises a substantially cylindrical hollow tube.

18. The electrical fixture mounting assembly according to claim 12, wherein mounting bracket comprises a bracket body and at least one flange extending outwardly from the bracket body.

* * * * *